United States Patent
Uchida et al.

(10) Patent No.: US 12,464,268 B2
(45) Date of Patent: Nov. 4, 2025

(54) SOLID-STATE IMAGING DEVICE BY COMPRESSIVE SENSING TECHNIQUE

(71) Applicant: HAMAMATSU PHOTONICS K.K., Hamamatsu (JP)

(72) Inventors: Keisuke Uchida, Hamamatsu (JP); Munenori Takumi, Hamamatsu (JP); Yukinobu Sugiyama, Hamamatsu (JP); Katsuhiro Ishii, Hamamatsu (JP); Ken-Ichi Kitayama, Hamamatsu (JP)

(73) Assignee: HAMAMATSU PHOTONICS K.K., Shizuoka (JP)

( * ) Notice: Subject to any disclaimer, the term of this patent is extended or adjusted under 35 U.S.C. 154(b) by 133 days.

(21) Appl. No.: 18/271,518

(22) PCT Filed: Oct. 11, 2021

(86) PCT No.: PCT/JP2021/037592
§ 371 (c)(1),
(2) Date: Jul. 10, 2023

(87) PCT Pub. No.: WO2022/180919
PCT Pub. Date: Sep. 1, 2022

(65) Prior Publication Data
US 2024/0056702 A1   Feb. 15, 2024

(30) Foreign Application Priority Data
Feb. 24, 2021   (JP) .................................. 2021-027232

(51) Int. Cl.
*H04N 25/78*   (2023.01)
*H04N 25/40*   (2023.01)
(Continued)

(52) U.S. Cl.
CPC ............. *H04N 25/78* (2023.01); *H04N 25/40* (2023.01); *H04N 25/766* (2023.01); *H04N 25/77* (2023.01)

(58) Field of Classification Search
CPC ...... H04N 25/78; H04N 25/40; H04N 25/766; H04N 25/77
See application file for complete search history.

(56) References Cited

U.S. PATENT DOCUMENTS

2020/0244894 A1*   7/2020   Ochiai ................... H04N 25/77

FOREIGN PATENT DOCUMENTS

| CN | 102918829 A | 2/2013 |
| CN | 111837380 A | 10/2020 |

(Continued)

OTHER PUBLICATIONS

International Preliminary Report on Patentability mailed Sep. 7, 2023 for PCT/JP2021/037592.
(Continued)

*Primary Examiner* — Nicholas G Giles
(74) *Attorney, Agent, or Firm* — Faegre Drinker Biddle & Reath LLP

(57) ABSTRACT

A solid-state imaging device includes a pixel array unit, a row control unit, a row readout unit, a column control unit, and a column readout unit. The pixel array unit includes MN pixels each including a photodiode for generating charges by receiving light and arrayed two-dimensionally in M rows and N columns. The pixel inputs an m-th row control signal output from the row control unit to an m-th row control line, inputs an n-th column control signal output from the column control unit to an n-th column control line, and selects whether the charges generated in the photodiode are output to an m-th row output line or an n-th column output line
(Continued)

based on a logical value of each of the m-th row control signal and the n-th column control signal.

17 Claims, 36 Drawing Sheets

(51) Int. Cl.
*H04N 25/766* (2023.01)
*H04N 25/77* (2023.01)

(56) References Cited

FOREIGN PATENT DOCUMENTS

| JP | 2011-250274 A | 12/2011 |
|----|---------------|---------|
| JP | 2019-161295 A | 9/2019 |

OTHER PUBLICATIONS

Duarte, Marco F. et al., "Single-Pixel Imaging via Compressive Sampling," IEEE Signal Processing Magazine, vol. 25 Issue 2, 2008, pp. 83-91.
Guicquero, William et al., "An algorithm architecture co-design for CMOS Compressive High Dynamic Range Imaging," IEEE Transactions on Computational Imaging, Jan. 2016, pp. 1-14.
Oike, Yusuke et al., "CMOS Image Sensor With Per-col. sigmadelta ΣΔ ADC and Programmable Compressed Sensing," IEEE Journal of Solid-State Circuits, Jan. 2013, pp. 318-328.
Uchida, K. et al., "Compressed Sensing using Profile Sensor," Optics & Photonics Japan 2020, Abstracts, 17pO22, Nov. 13, 2020.

\* cited by examiner

*Fig.16*

SOLID-STATE IMAGING DEVICE BY COMPRESSIVE SENSING TECHNIQUE

TECHNICAL FIELD

The present disclosure relates to a solid-state imaging device.

BACKGROUND ART

An imaging device described in Non Patent Document 1 includes a spatial light modulator capable of modulating an intensity ratio of output light with respect to input light for each pixel, and a photodetector for detecting the intensity of the input light, and can acquire an image of an object by a compressive sensing technique. In the imaging device described in this document, the image of the object is formed on a modulation plane of the spatial light modulator, light amplitude modulation is performed for each pixel by the spatial light modulator based on a set light amplitude modulation pattern, and the intensity of the modulated light is detected by the photodetector.

In the above configuration, a plurality of types of light amplitude modulation patterns are sequentially set in the spatial light modulator, a light intensity value is acquired by the photodetector when each light amplitude modulation pattern is set, and the light amplitude modulation pattern and the corresponding light intensity value are stored in the storage unit. Further, the image of the object can be obtained by analyzing the plurality of sets of light amplitude modulation patterns and the light intensity values stored in the storage unit.

The photodetector used in the above imaging device does not need to be an image sensor in which a plurality of pixels are arrayed for detecting an intensity distribution in a beam cross-section of the input light, and may be a point sensor including a single pixel. Therefore, when it is required to image the object in a wavelength range where the use of the image sensor is not appropriate, or when it is required to image the object with lower noise or higher performance than the image sensor, or the like, imaging by the imaging device using the point sensor is effective. Further, when the image to be acquired by imaging is sparse, the image of the object can be acquired by using the light amplitude modulation patterns with the number smaller than the number of pixels by the compressive sensing technique.

CITATION LIST

Non Patent Literature

Non Patent Document 1: Marco F. Duarte et al., "Single-Pixel Imaging via Compressive Sampling", IEEE Signal Processing Magazine, Vol. 25 Issue 2, pp. 83-91, 2008

SUMMARY OF INVENTION

Technical Problem

The imaging device described in Non Patent Document 1 needs to arrange an optical system using the spatial light modulator in addition to the photodetector, and thus, cost and power consumption increase, and arrangement of the optical system is not easy.

An object of an embodiment is to provide a solid-state imaging device capable of easily performing acquisition of an image by the compressive sensing technique.

Solution to Problem

An embodiment is a solid-state imaging device. The solid-state imaging device includes (1) MN pixels each including a photodiode for generating charges by receiving light and arrayed two-dimensionally in M rows and N columns (M and N are each an integer of 2 or more); (2) a row control unit coupled to N pixels of an m-th row (m is an integer of 1 or more and M or less) in the M rows and the N columns by an m-th row control line, and for applying an m-th row control signal to the N pixels of the m-th row via the m-th row control line; (3) a row readout unit coupled to the N pixels of the m-th row in the M rows and the N columns by an m-th row output line, and for inputting the charges generated in the photodiode of each of the N pixels of the m-th row and output to the m-th row output line; (4) a column control unit coupled to M pixels of an n-th column (n is an integer of 1 or more and N or less) in the M rows and the N columns by an n-th column control line, and for applying an n-th column control signal to the M pixels of the n-th column via the n-th column control line; and (5) a column readout unit coupled to the M pixels of the n-th column in the M rows and the N columns by an n-th column output line, and for inputting the charges generated in the photodiode of each of the M pixels of the n-th column and output to the n-th column output line, and (6) the pixel of the m-th row and the n-th column in the MN pixels is configured to select whether the charges generated in the photodiode are output to the m-th row output line or the n-th column output line based on a logical value of each of the m-th row control signal and the n-th column control signal.

Advantageous Effects of Invention

According to the solid-state imaging device of the embodiment, it is possible to easily perform acquisition of an image by the compressive sensing technique.

BRIEF DESCRIPTION OF DRAWINGS

FIG. 16 is a diagram illustrating an example of charge output of each pixel in the pixel array unit 10 in a second period when the pixel $P_{m,n}$ is set as the circuit configuration example of FIG. 6.

DESCRIPTION OF EMBODIMENTS

Hereinafter, embodiments of a solid-state imaging device will be described in detail with reference to the accompanying drawings. In the description of the drawings, the same elements will be denoted by the same reference signs, and redundant description will be omitted. The present invention is not limited to these examples.

Figure 1:
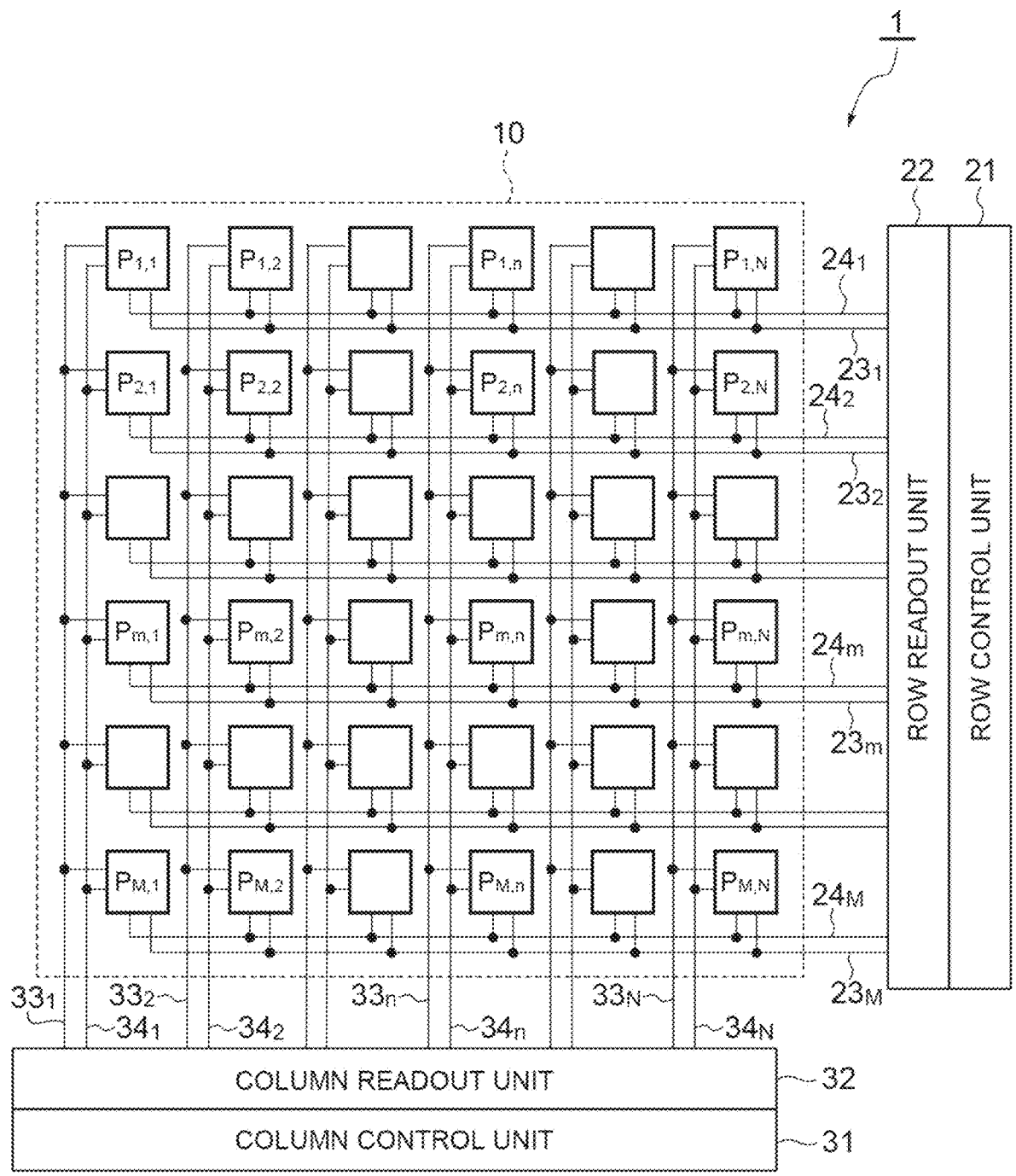
FIG. 1 is a diagram illustrating an entire configuration of a solid-state imaging device 1 according to an embodiment.

FIG. 1 is a diagram illustrating an entire configuration of a solid-state imaging device 1 according to an embodiment. The solid-state imaging device 1 includes a pixel array unit 10, a row control unit 21, a row readout unit 22, a column control unit 31, and a column readout unit 32.

The pixel array unit 10 includes MN pixels $P_{1,1}$ to $P_{M,N}$ being arrayed two-dimensionally in M rows and N columns. The MN pixels $P_{1,1}$ to $P_{M,N}$ have a common configuration. The pixel $P_{m,n}$ is located at an m-th row and an n-th column. The pixel $P_{m,n}$ includes a photodiode for generating charges by receiving light, and has a passive pixel sensor (PPS) configuration. In addition, each of M and N is an integer of 2 or more. m is an integer of 1 or more and M or less. n is an integer of 1 or more and N or less.

The row control unit 21 is coupled to the N pixels $P_{m,1}$ to $P_{m,N}$ of the m-th row by an m-th row control line $23_m$, and applies an m-th row control signal $X_m$ to the N pixels $P_{m,1}$ to $P_{m,N}$ of the m-th row via the m-th row control line $23_m$. The row readout unit 22 is coupled to the N pixels $P_{m,1}$ to $P_{m,N}$ of the m-th row by an m-th row output line $24_m$, and inputs the charges generated in the photodiode of each of the N pixels $P_{m,1}$ to $P_{m,N}$ of the m-th row and output to the m-th row output line $24_m$.

The column control unit 31 is coupled to the M pixels $P_{1,n}$ to $P_{M,n}$ of the n-th column by an n-th column control line $33_n$, and applies an n-th column control signal $Y_n$ to the M pixels $P_{1,n}$ to $P_{M,n}$ of the n-th column via the n-th column control line $33_n$. The column readout unit 32 is coupled to the M pixels $P_{1,n}$ to $P_{M,n}$ of the n-th column by an n-th column output line $34_n$, and inputs the charges generated in the photodiode of each of the M pixels $P_{1,n}$ to $P_{M,n}$ of the n-th column and output to the n-th column output line $34_n$.

The pixel $P_{m,n}$ inputs the m-th row control signal $X_m$ output from the row control unit 21 to the m-th row control line $23_m$, and inputs the n-th column control signal $Y_n$ output from the column control unit 31 to the n-th column control line $33_n$. The pixel $P_{m,n}$ selects whether the charges generated in the photodiode are output to the m-th row output line $24_m$ or the n-th column output line $34_n$ based on a logical value of each of the m-th row control signal $X_m$ and the n-th column control signal $Y_n$ being input as described above.

In the MN pixels $P_{1,1}$ to $P_{M,N}$ of the pixel array unit 10, a pixel which outputs the charges to the m-th row output line $24_m$ and a pixel which outputs the charges to the n-th column output line $34_n$ are determined by the first to M-th row control signals $X_1$ to $X_M$ and the first to N-th column control signals $Y_1$ to $Y_N$. By changing the pattern of the first to M-th row control signals $X_1$ to $X_M$ or the pattern of the first to N-th column control signals $Y_1$ to $Y_N$, the pixel which outputs the charges to the m-th row output line $24_m$ can be changed, and further, the pixel which outputs the charges to the n-th column output line $34_n$ can be changed.

Therefore, the solid-state imaging device 1 described above, when acquiring an image by the compressive sensing technique, does not need to use a spatial light modulator which is necessary in the conventional configuration, and thus, an increase in cost and power consumption is suppressed, and arrangement of an optical system is facilitated. That is, the solid-state imaging device 1 can easily perform acquisition of an image by the compressive sensing technique.

When the image acquisition is performed by the compressive sensing technique by using the solid-state imaging device 1, a plurality of patterns are required for each of the first to M-th row control signals $X_1$ to $X_M$ and the first to N-th column control signals $Y_1$ to $Y_N$. The plurality of patterns may be selected at random or may be set based on a Hadamard matrix.

Further, when the image acquisition is performed by the compressive sensing technique by using the solid-state imaging device 1, it may be performed based on an amount of charges output to each of the first to M-th row output lines $24_1$ to $24_M$ and the first to N-th column output lines $34_1$ to $34_N$, may be performed based on a total amount of charges output to the first to M-th row output lines $24_1$ to $24_M$ and a total amount of charges output to the first to N-th column output lines $34_1$ to $34_N$, or may be performed based on a total amount of charges output to the first to M-th row output lines $24_1$ to $24_M$ and the first to N-th column output lines $34_1$ to $34_N$.

The m-th row control line may be one line or may be a plurality of lines. When two lines are provided as the m-th row control line, the m-th row control signal applied to the pixel $P_{m,n}$ by one m-th row control line may be a logically inverted signal of the m-th row control signal applied to the pixel $P_{m,n}$ by the other m-th row control line.

The n-th column control line may be one line or may be a plurality of lines. When two lines are provided as the n-th column control line, the n-th column control signal applied to the pixel $P_{m,n}$ by one n-th column control line may be a logically inverted signal of the n-th column control signal applied to the pixel $P_{m,n}$ by the other n-th column control line.

The m-th row output line may be one line or may be a plurality of lines. Further, the n-th column output line may be one line or may be a plurality of lines.

Figure 2:
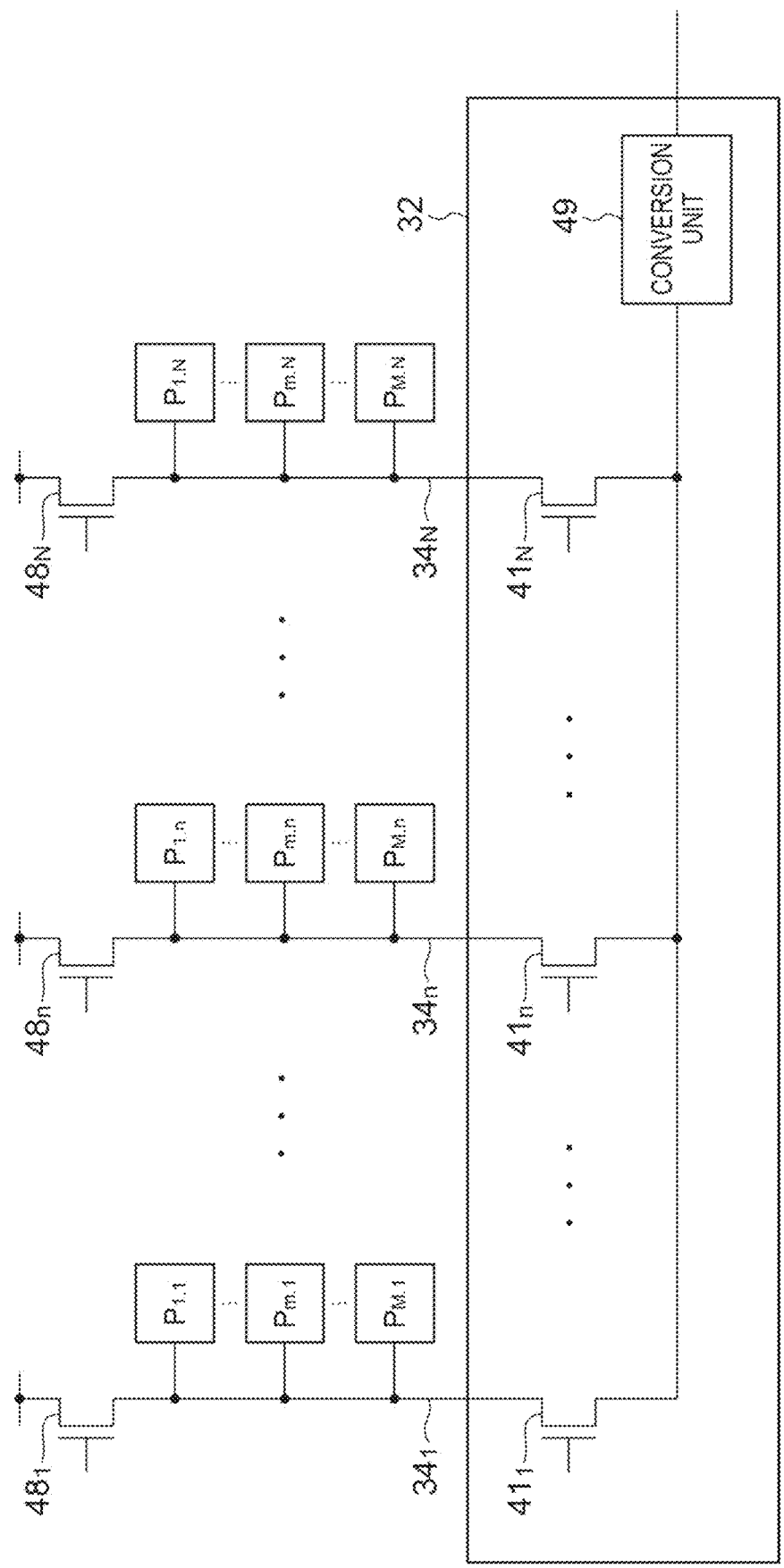
FIG. 2 is a diagram illustrating a circuit configuration example of a column readout unit 32.

Next, a circuit configuration example of the column readout unit 32 will be described with reference to FIG. 2 to FIG. 4. FIG. 2 is a diagram illustrating a circuit configuration example of the column readout unit 32. The column readout unit 32 illustrated in this diagram includes NMOS transistors $41_1$ to $41_N$ and a conversion unit 49.

A drain of the NMOS transistor $41_n$ is connected to the n-th column output line $34_n$. A source of the NMOS transistor $41_n$ is connected to the conversion unit 49. The NMOS transistor $41_n$ operates as a switch in which a conductive state (ON) or a non-conductive state (OFF) is set between the drain and the source according to a level of a signal applied to a gate.

The conversion unit 49 is connected to the source of each of the NMOS transistors $41_1$ to $41_N$. The conversion unit 49 includes a charge amplifier for outputting a voltage value according to an amount of input charges, and an AD converter for outputting a digital value according to the voltage value output from the charge amplifier.

When any one of the NMOS transistors $41_1$ to $41_N$ is in the ON state, the charges output from any one pixel of the M pixels $P_{1,n}$ to $P_{M,n}$ of the n-th column connected via the NMOS transistor $41_n$ in the ON state and the n-th column output line $34_n$ are input to the conversion unit 49, and the digital value according to the charge amount is output from the conversion unit 49. The NMOS transistors $41_1$ to $41_N$ may be in the ON state at the same time, or may be sequentially in the ON state one by one.

In this diagram, NMOS transistors $48_1$ to $48_N$ are additionally illustrated. A drain of the NMOS transistor $48_n$ is connected to a power potential supply terminal. A source of the NMOS transistor $48_n$ is connected to the n-th column output line $34_n$. The NMOS transistor $48_n$ also operates as a switch. When the NMOS transistor $48_n$ is in the ON state, the charges generated in the photodiode of each of the M pixels $P_{1,n}$ to $P_{M,n}$ of the n-th column connected to the n-th column output line $34_n$ can be initialized.

Figure 3:
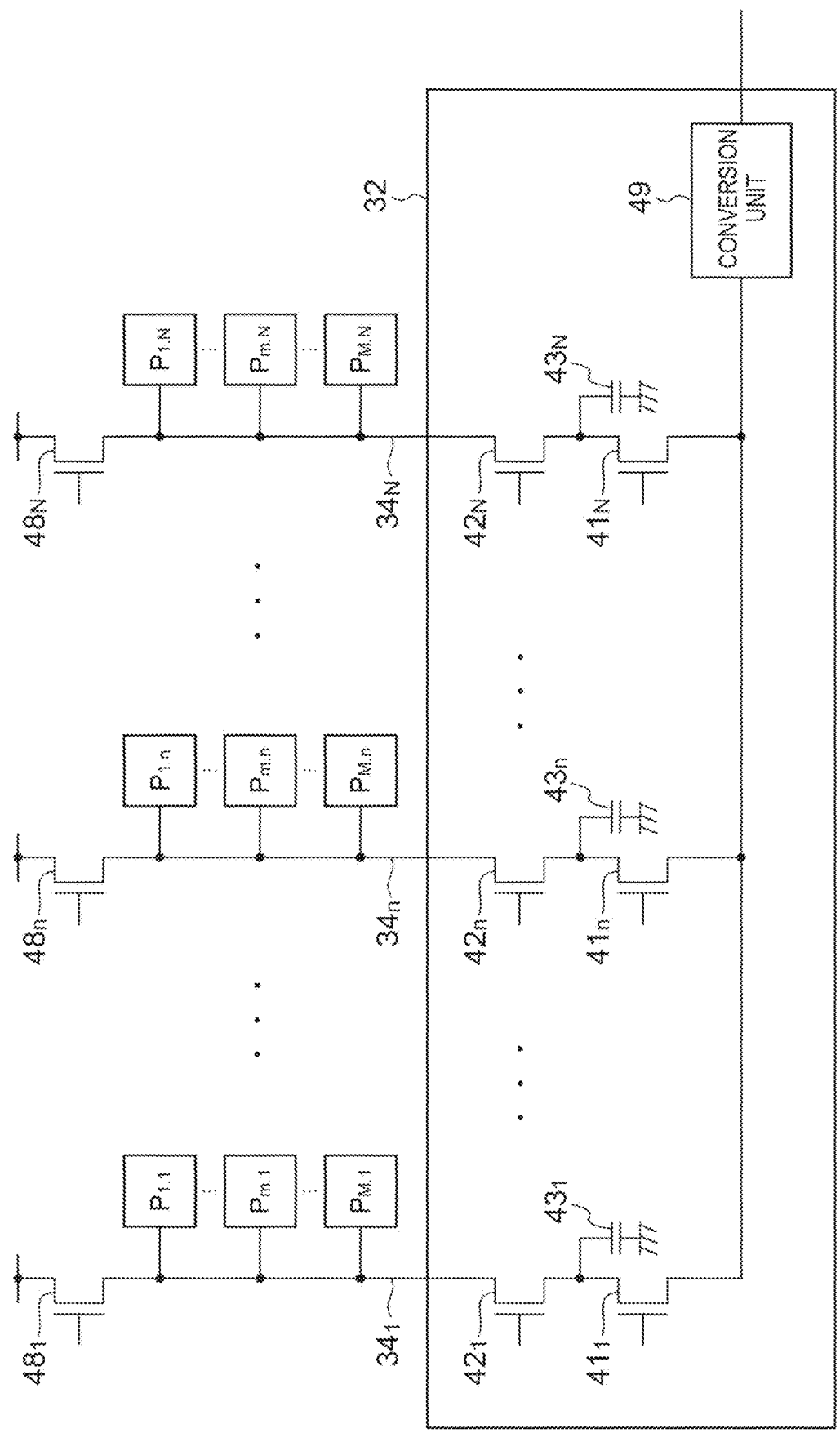
FIG. 3 is a diagram illustrating another circuit configuration example of the column readout unit 32.

FIG. 3 is a diagram illustrating another circuit configuration example of the column readout unit 32. The column readout unit 32 illustrated in this diagram includes NMOS transistors $42_1$ to $42_N$ and capacitors $43_1$ to $43_N$, in addition to the NMOS transistors $41_1$ to $41_N$ and the conversion unit 49.

A drain of the NMOS transistor $42_n$ is connected to the n-th column output line $34_n$. A source of the NMOS transistor $42_n$ is connected to the drain of the NMOS transistor $41_n$. The capacitor $43_n$ is provided between the source of the NMOS transistor $42_n$ and a ground potential supply terminal. The NMOS transistor $42_n$ also operates as a switch.

In this circuit configuration example, when the NMOS transistor $41_n$ is in the OFF state, and the NMOS transistor $42_n$ is in the ON state, the charges arriving from the n-th column output line $34_n$ are transferred to and accumulated in the capacitor $43_n$. Thereafter, when the NMOS transistor $42_n$ is in the OFF state, and the NMOS transistor $41_n$ is in the ON state, the charges accumulated in the capacitor $43_n$ are input to the conversion unit 49, and the digital value according to the charge amount is output from the conversion unit 49. The NMOS transistors $41_1$ to $41_N$ may also be in the ON state at the same time, or may be sequentially in the ON state one by one.

Figure 4:
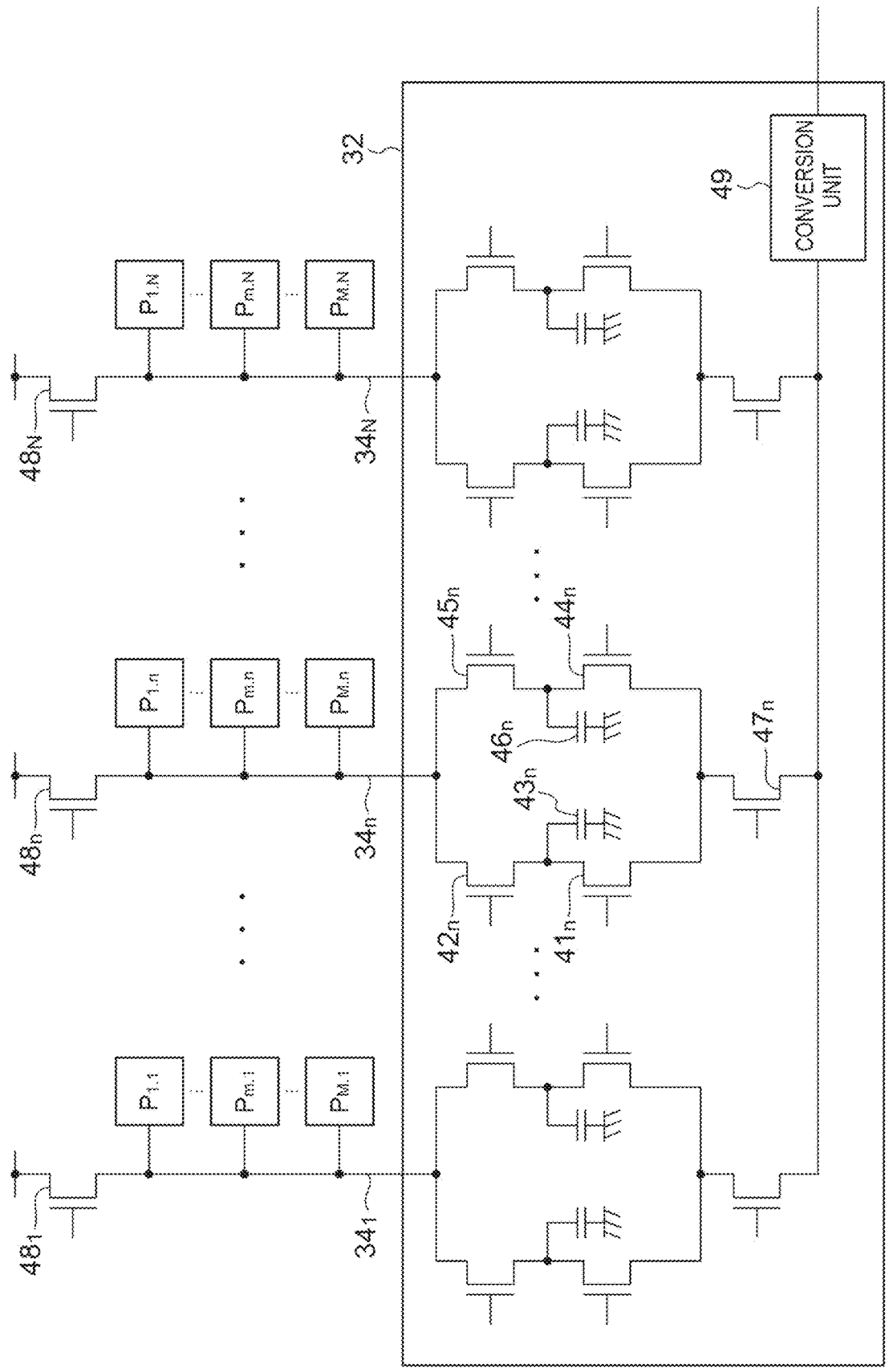
FIG. 4 is a diagram illustrating still another circuit configuration example of the column readout unit 32.

FIG. 4 is a diagram illustrating still another circuit configuration example of the column readout unit 32. The column readout unit 32 illustrated in this diagram includes the NMOS transistors $41_1$ to $41_N$, the NMOS transistors $42_1$ to $42_N$, the capacitors $43_1$ to $43_N$, NMOS transistors $44_1$ to $44_N$, NMOS transistors $45_1$ to $45_N$, capacitors $46_1$ to $46_N$, NMOS transistors $47_1$ to $47_N$, and the conversion unit 49.

The NMOS transistors $44_n$, $45_n$ and the capacitor $46_n$ have the same configuration as the NMOS transistors $41_n$, $42_n$ and the capacitor $43_n$. A drain of the NMOS transistor $47_n$ is connected to the source of each of the NMOS transistors $41_n$ and $44_n$. The conversion unit 49 is connected to the source of each of the NMOS transistors $47_1$ to $47_N$.

In this circuit configuration example, the two capacitors $43_n$ and $46_n$ are provided for the n-th column output line $34_n$, and thus, in the period in which the charges arriving from the n-th column output line $34_n$ are transferred to and accumulated in one capacitor, the charges accumulated in the other capacitor are input to the conversion unit 49, and the digital value according to the charge amount is output from the conversion unit 49.

For example, when the NMOS transistors $41_n$ and $45_n$ are in the OFF state, and the NMOS transistor $42_n$ is in the ON state, the charges arriving from the n-th column output line $34_n$ are transferred to and accumulated in the capacitor $43_n$, further, when the NMOS transistors $44_n$ and $47_n$ are in the ON state, the charges accumulated in the capacitor $46_n$ are input to the conversion unit 49, and the digital value according to the charge amount is output from the conversion unit 49.

In addition, the conversion unit for outputting the digital value according to the charge amount may be only one unit provided in the column readout unit 32, or may be provided for each column in the column readout unit 32. The row readout unit 22 may have a configuration similar to that of the column readout unit 32. Further, the conversion unit for outputting the digital value according to the charge amount may be only one unit provided in the row readout unit 22 and the column readout unit 32.

Next, a circuit configuration example of the column control unit 31 will be described. The column control unit 31 may input the first to N-th column control signals $Y_1$ to $Y_N$ in parallel, and output the n-th column control signal $Y_n$ to the n-th column control line $33_n$, or further, may input the first to N-th column control signals $Y_1$ to $Y_N$ as serial data, and output the n-th column control signal $Y_n$ to the n-th column control line $33_n$. Preferably, the column control unit 31 may be configured as illustrated in FIG. 5.

Figure 5:
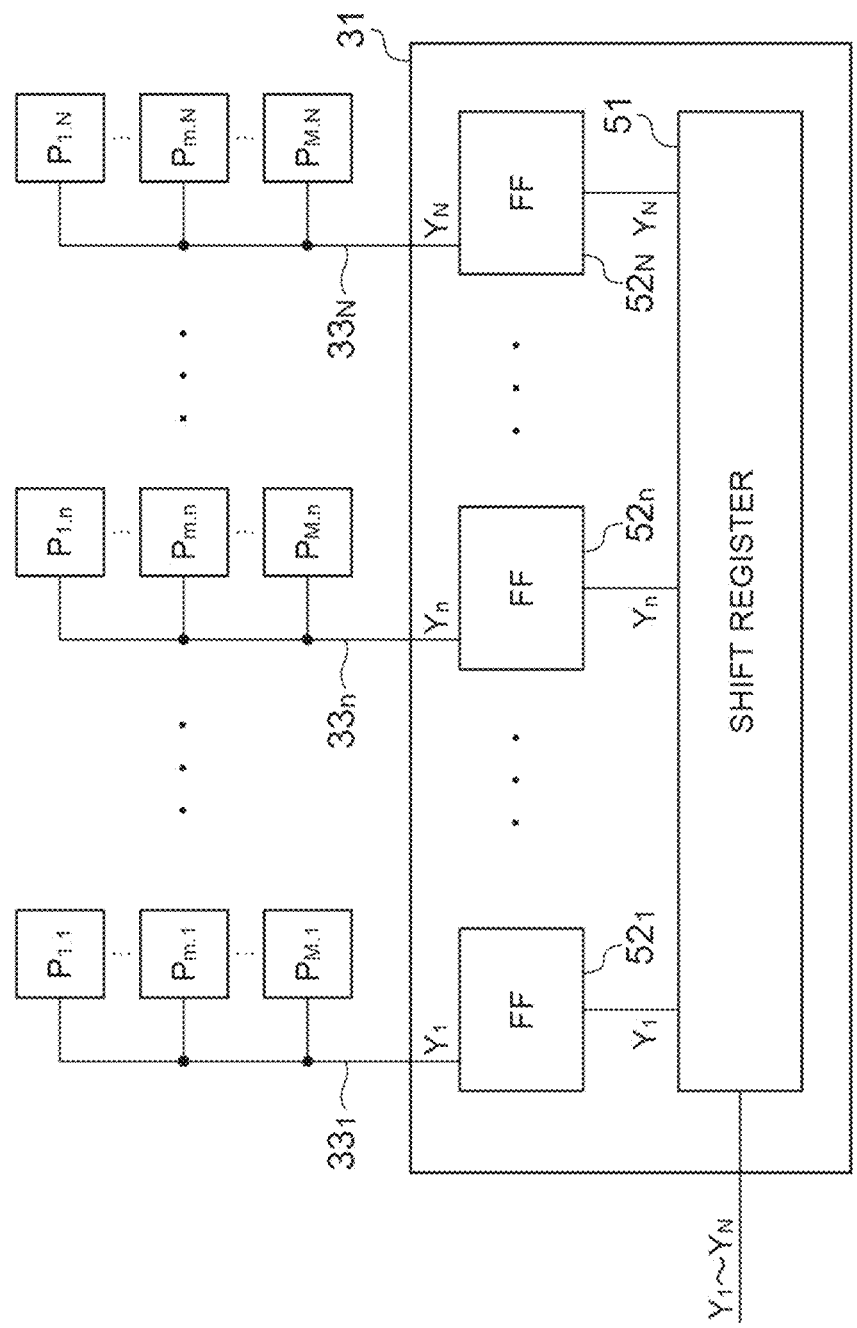
FIG. 5 is a diagram illustrating a circuit configuration example of a column control unit 31.

FIG. 5 is a diagram illustrating a circuit configuration example of the column control unit 31. The column control unit 31 illustrated in this diagram includes a shift register 51 and flip-flops $52_1$ to $52_N$. The shift register 51 serially inputs the first to N-th column control signals $Y_1$ to $Y_N$, and outputs the n-th column control signal $Y_n$ to the flip-flop $52_n$. The flip-flop $52_n$ latches the n-th column control signal $Y_n$ output from the shift register 51, and outputs the latched n-th column control signal $Y_n$ to the n-th column control line $33_n$.

The flip-flop $52_n$ is preferably an RS flip-flop. In this case, when latch is ON, the flip-flop $52_n$ can output the latched n-th column control signal $Y_n$ to the n-th column control line $33_n$. When set is ON, the flip-flop $52_n$ can reset the pixel $P_{m,n}$ by outputting the logical value 1 to the n-th column control line $33_n$. Further, when reset is ON, the flip-flop $52_n$ can set the pixel $P_{m,n}$ to OFF by outputting the logical value 0 to the n-th column control line $33_n$.

As in this circuit configuration example, when the column control unit 31 includes the shift register 51 and the flip-flops $52_1$ to $52_N$, in the period of outputting the n-th column control signal $Y_n$ from the flip-flop $52_n$ to the n-th column control line $33_n$, the shift register 51 can serially input the next first to N-th column control signals $Y_1$ to $Y_N$.

In addition, the row control unit 21 may have a configuration similar to that of the column control unit 31. The shift register may be provided in each of the row control unit 21 and the column control unit 31, or may be only one provided in the row control unit 21 and the column control unit 31.

Next, a circuit configuration example of the pixel $P_{m,n}$ will be described. The pixel $P_{m,n}$ includes one or a plurality of photodiodes for generating the charges by receiving light, and is configured to select whether or not the charges generated in the photodiode are output to the m-th row output line $24_m$ or the n-th column output line $34_n$ based on the logical value of each of the m-th row control signal $X_m$ and the n-th column control signal $Y_n$ being input. Various configurations can be used as the configuration of the circuit for performing the selection.

Figure 6:
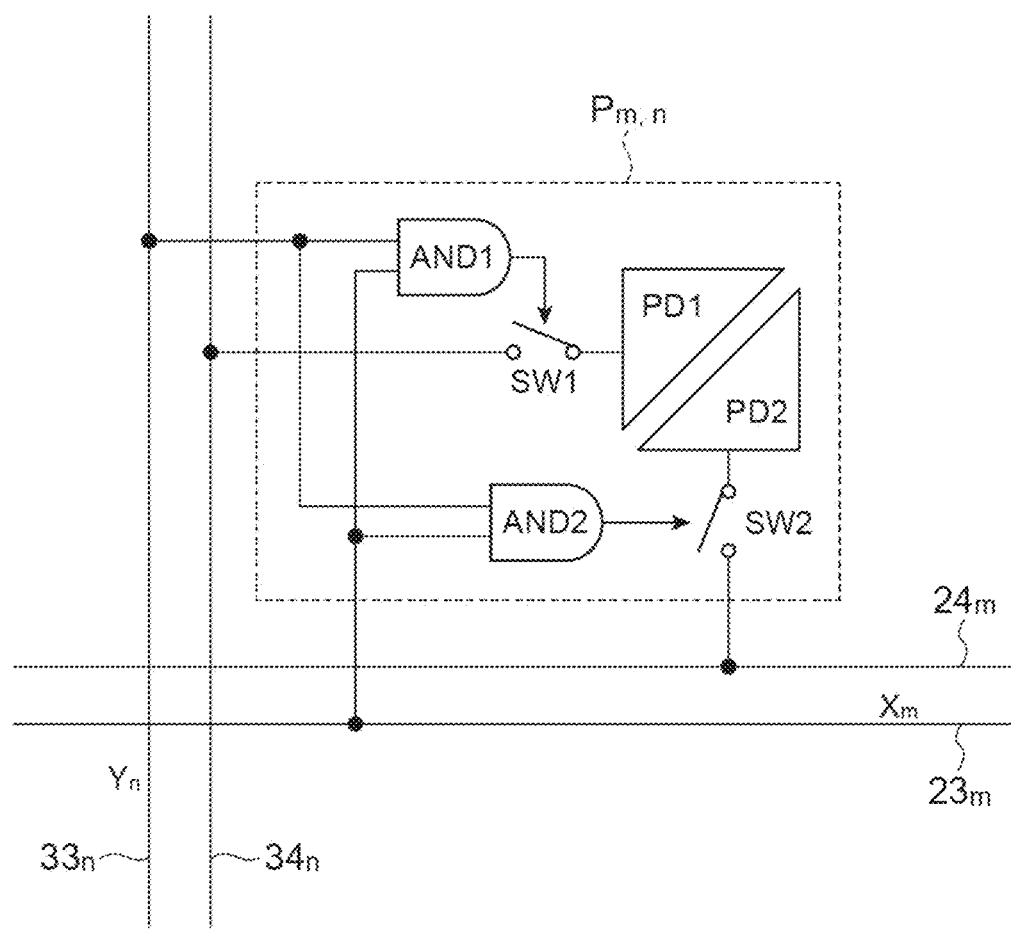
FIG. 6 is a diagram illustrating a circuit configuration example of a pixel $P_{m,n}$.

FIG. 6 is a diagram illustrating a circuit configuration example of the pixel $P_{m,n}$. The pixel $P_{m,n}$ illustrated in this diagram includes a photodiode PD1, a photodiode PD2, a switch SW1, a switch SW2, an AND circuit AND1, and an AND circuit AND2. Each of the switches SW1 and SW2 may be constituted by a MOS transistor.

The AND circuit AND1 inputs the m-th row control signal $X_m$ and the n-th column control signal $Y_n$, sets the switch SW1 to the ON state when both the signals have the logical value 1, and sets the switch SW1 to the OFF state otherwise. The switch SW1 is provided between the photodiode PD1 and the n-th column output line $34_n$, and when it is in the ON state, the charges generated in the photodiode PD1 are output to the n-th column output line $34_n$.

The AND circuit AND2 inputs the m-th row control signal $X_m$ and the n-th column control signal $Y_n$, sets the switch SW2 to the ON state when both the signals have the logical value 1, and sets the switch SW2 to the OFF state otherwise. The switch SW2 is provided between the photodiode PD2 and the m-th row output line $24_m$, and when it is in the ON state, the charges generated in the photodiode PD2 are output to the m-th row output line $24_m$.

Figure 7:
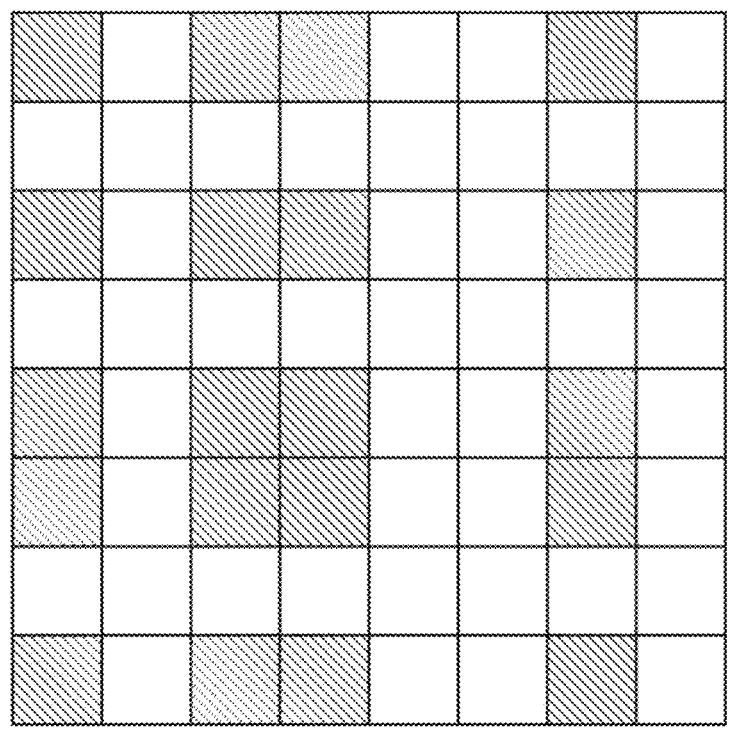
FIG. 7 is a diagram illustrating an example of charge output of each pixel in a pixel array unit 10 when the pixel $P_{m,n}$ is set as the circuit configuration example of FIG. 6.

FIG. 7 is a diagram illustrating an example of the charge output of the pixels in the pixel array unit 10 when the pixel $P_{m,n}$ is set as the circuit configuration example of FIG. 6. In this diagram, each of rectangular regions of 8 rows and 8 columns illustrates a pixel. Each of the pixels with hatching outputs the charges generated in the photodiode PD1 to the n-th column output line $34_n$ and outputs the charges generated in the photodiode PD2 to the m-th row output line $24_m$. Each of the other pixels does not output the charges to the m-th row output line $24_m$ and the n-th column output line $34_n$.

Figure 8:
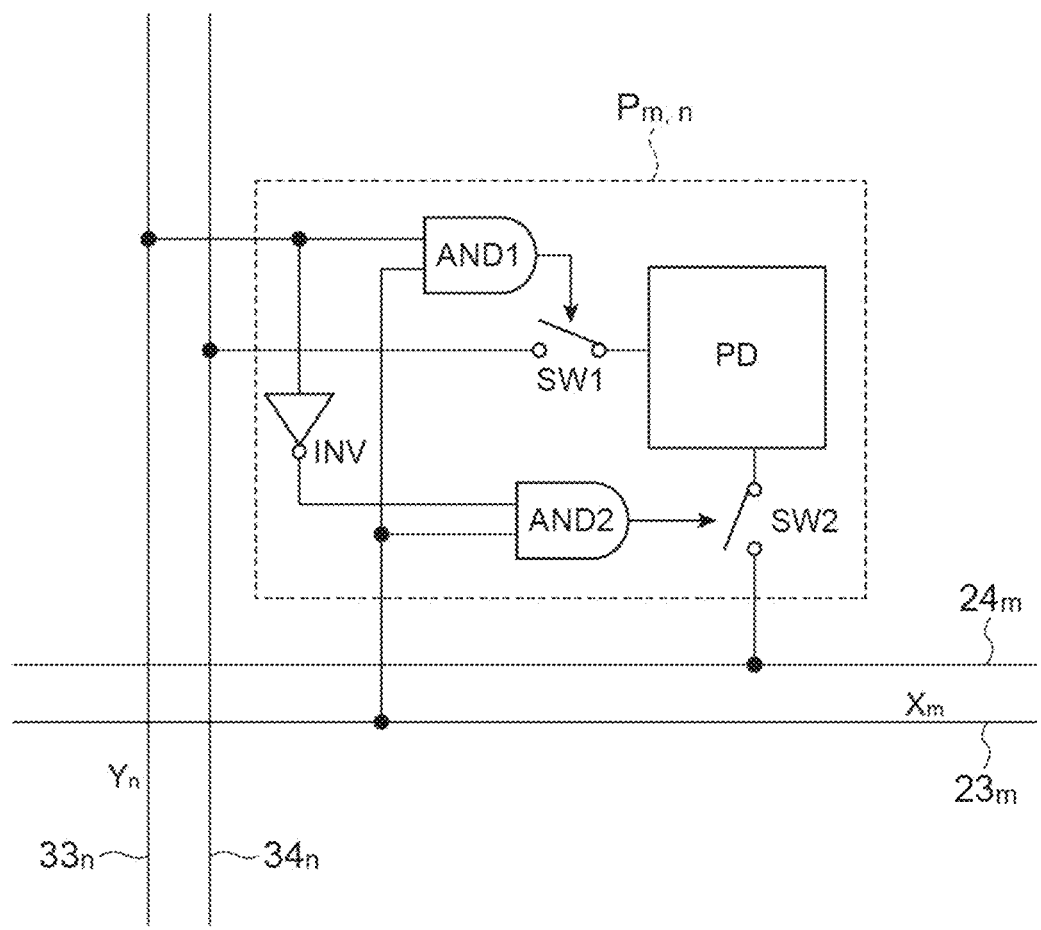
FIG. 8 is a diagram illustrating another circuit configuration example of the pixel $P_{m,n}$.

FIG. 8 is a diagram illustrating another circuit configuration example of the pixel $P_{m,n}$. The pixel $P_{m,n}$ illustrated in this diagram includes a photodiode PD, a switch SW1, a switch SW2, an AND circuit AND1, an AND circuit AND2, and an inverter circuit INV.

The AND circuit AND1 inputs the m-th row control signal $X_m$ and the n-th column control signal $Y_n$, sets the switch SW1 to the ON state when both the signals have the logical value 1, and sets the switch SW1 to the OFF state otherwise. The switch SW1 is provided between the photodiode PD and the n-th column output line $34_n$, and when it is in the ON state, the charges generated in the photodiode PD are output to the n-th column output line $34_n$.

The inverter circuit INV inputs the n-th column control signal $Y_n$, and outputs a logically inverted signal of the n-th column control signal $Y_n$ to the AND circuit AND2.

The AND circuit AND2 inputs the m-th row control signal $X_m$ and the output signal of the inverter circuit INV, sets the switch SW2 to the ON state when both the signals have the logical value 1, and sets the switch SW2 to the OFF state otherwise. That is, when the m-th row control signal $X_m$ has the logical value 1 and the n-th column control signal $Y_n$ has the logical value 0, the AND circuit AND2 sets the switch SW2 to the ON state. The switch SW2 is provided between the photodiode PD and the m-th row output line $24_m$, and when it is in the ON state, the charges generated in the photodiode PD are output to the m-th row output line $24_m$.

In this circuit configuration example, the switches SW1 and SW2 are not in the ON state at the same time, and thus, only one photodiode may be included in the pixel $P_{m,n}$. Therefore, compared to the configuration example illustrated in FIG. 6, the configuration example illustrated in FIG. 8 may increase an area of a photosensitive region of the photodiode.

Figure 9:
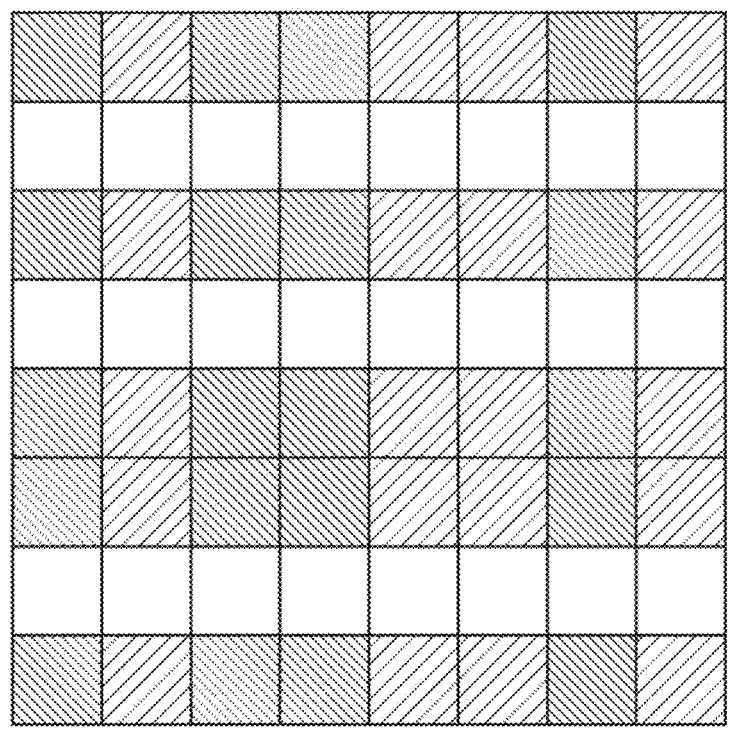
FIG. 9 is a diagram illustrating an example of charge output of each pixel in the pixel array unit 10 when the pixel $P_{m,n}$ is set as the circuit configuration example of FIG. 8.

FIG. 9 is a diagram illustrating an example of the charge output of the pixels in the pixel array unit 10 when the pixel $P_{m,n}$ is set as the circuit configuration example of FIG. 8. In this diagram also, each of rectangular regions of 8 rows and 8 columns illustrates a pixel. Each of the pixels with first type (any one type) hatching outputs the charges generated in the photodiode PD to the n-th column output line $34_n$, and each of the pixels with second type hatching outputs the charges generated in the photodiode PD to the m-th row output line $24_m$. Each of the other pixels does not output the charges to the m-th row output line $24_m$ and the n-th column output line $34_n$.

Figure 10:
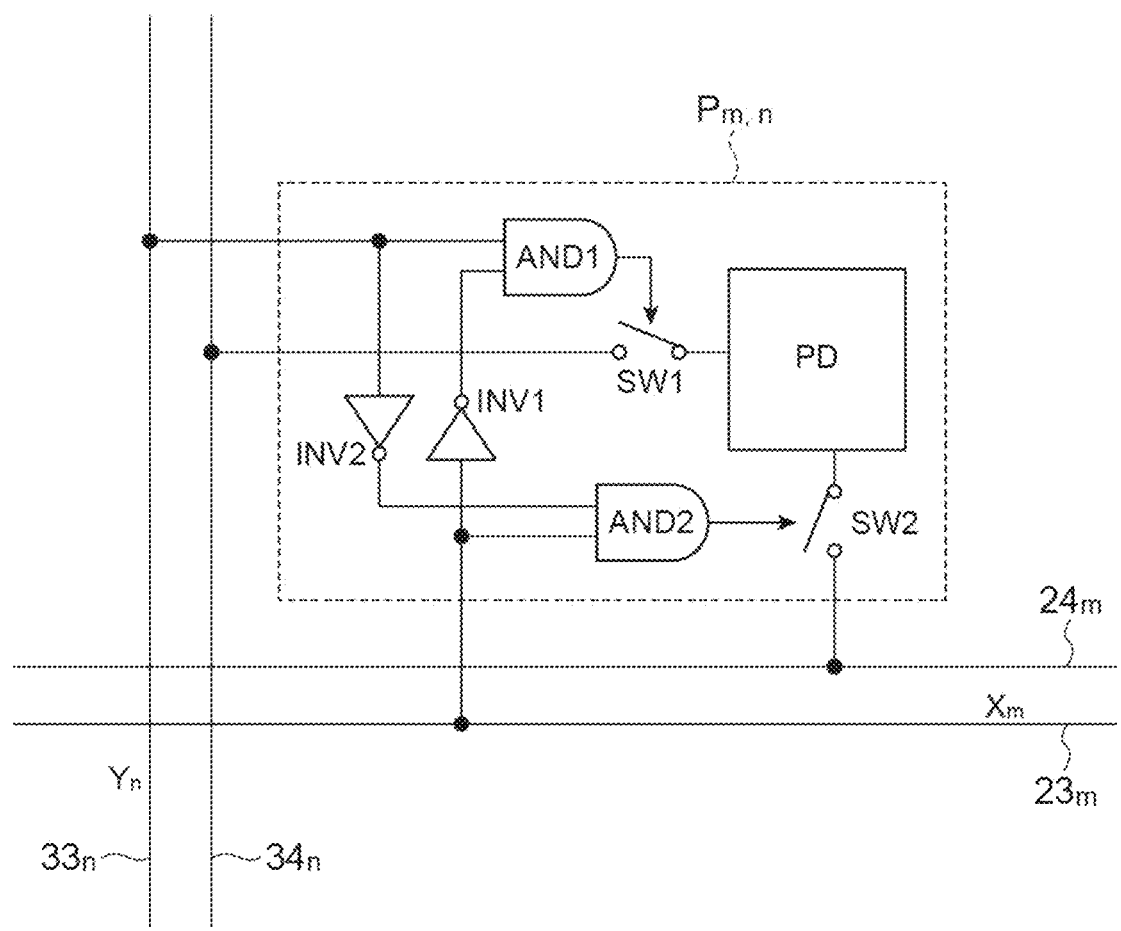
FIG. 10 is a diagram illustrating another circuit configuration example of the pixel $P_{m,n}$.

FIG. 10 is a diagram illustrating another circuit configuration example of the pixel $P_{m,n}$. The pixel $P_{m,n}$ illustrated in this diagram includes a photodiode PD, a switch SW1, a switch SW2, an AND circuit AND1, an AND circuit AND2, an inverter circuit INV1, and an inverter circuit INV2.

The inverter circuit INV1 inputs the m-th row control signal $X_m$, and outputs a logically inverted signal of the m-th row control signal $X_m$ to the AND circuit AND1.

The AND circuit AND1 inputs the output signal of the inverter circuit INV1 and the n-th column control signal $Y_n$, sets the switch SW1 to the ON state when both the signals have the logical value 1, and sets the switch SW1 to the OFF state otherwise. That is, when the m-th row control signal $X_m$ has the logical value 0 and the n-th column control signal $Y_n$ has the logical value 1, the AND circuit AND1 sets the switch SW1 to the ON state. The switch SW1 is provided between the photodiode PD and the n-th column output line $34_n$, and when it is in the ON state, the charges generated in the photodiode PD are output to the n-th column output line $34_n$.

The inverter circuit INV2 inputs the n-th column control signal $Y_n$, and outputs a logically inverted signal of the n-th column control signal $Y_n$ to the AND circuit AND2.

The AND circuit AND2 inputs the m-th row control signal $X_m$ and the output signal of the inverter circuit INV2, sets the switch SW2 to the ON state when both the signals have the logical value 1, and sets the switch SW2 to the OFF state otherwise. That is, when the m-th row control signal $X_m$ has the logical value 1 and the n-th column control signal $Y_n$ has the logical value 0, the AND circuit AND2 sets the switch SW2 to the ON state. The switch SW2 is provided between the photodiode PD and the m-th row output line $24_m$, and when it is in the ON state, the charges generated in the photodiode PD are output to the m-th row output line $24_m$.

In this circuit configuration example also, the switches SW1 and SW2 are not in the ON state at the same time, and thus, only one photodiode may be included in the pixel $P_{m,n}$. Therefore, compared to the configuration example illustrated in FIG. 6, the configuration example illustrated in FIG. 10 may also increase an area of a photosensitive region of the photodiode.

Figure 11:
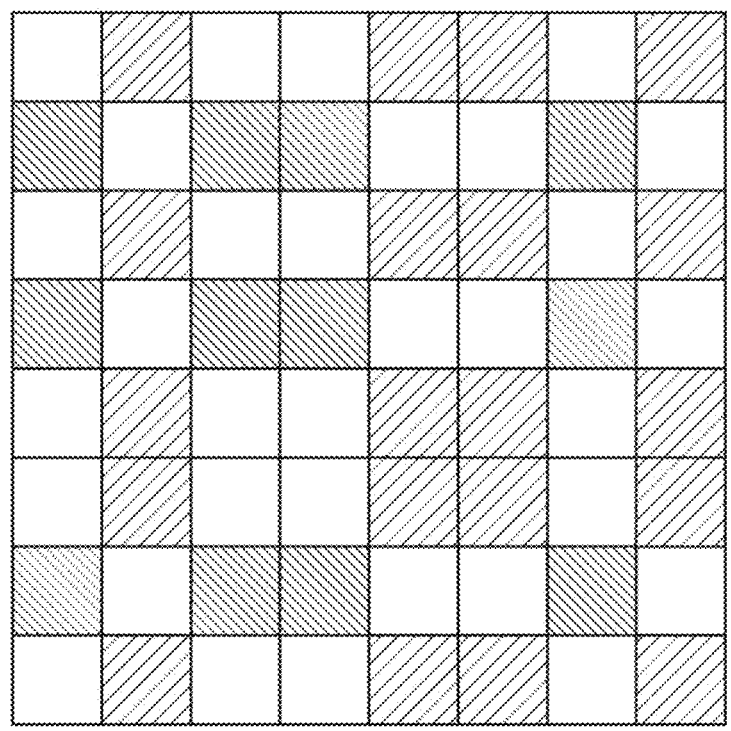
FIG. 11 is a diagram illustrating an example of charge output of each pixel in the pixel array unit 10 when the pixel $P_{m,n}$ is set as the circuit configuration example of FIG. 10.

FIG. 11 is a diagram illustrating an example of the charge output of the pixels in the pixel array unit 10 when the pixel $P_{m,n}$ is set as the circuit configuration example of FIG. 10. In this diagram also, each of rectangular regions of 8 rows and 8 columns illustrates a pixel. Each of the pixels with first type hatching outputs the charges generated in the photodiode PD to the n-th column output line $34_n$, and each of the pixels with second type hatching outputs the charges generated in the photodiode PD to the m-th row output line $24_m$. Each of the other pixels does not output the charges to the m-th row output line $24_m$ and the n-th column output line $34_n$.

Figure 12:
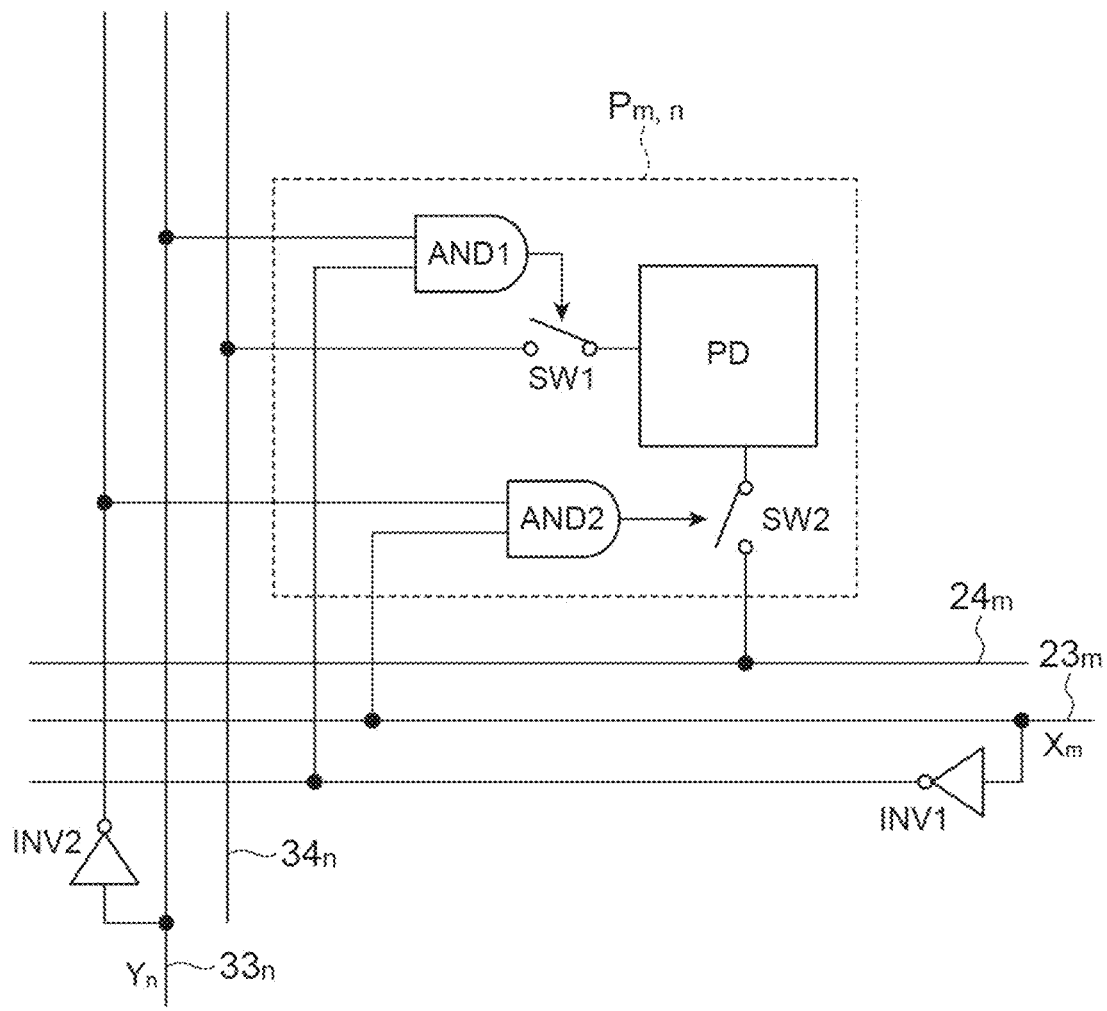
FIG. 12 is a diagram illustrating another circuit configuration example of the pixel $P_{m,n}$.

FIG. 12 is a diagram illustrating another circuit configuration example of the pixel $P_{m,n}$. The pixel $P_{m,n}$ illustrated in this diagram includes a photodiode PD, a switch SW1, a switch SW2, an AND circuit AND1, and an AND circuit AND2.

An inverter circuit INV1 for outputting a logically inverted signal of the m-th row control signal $X_m$ is provided for the N pixels $P_{m,1}$ to $P_{m,N}$ of the m-th row, and further, the row control line for applying the output signal of the inverter circuit INV1 is separately provided in addition to the row control line for applying the m-th row control signal $X_m$.

An inverter circuit INV2 for outputting a logically inverted signal of the n-th column control signal $Y_n$ is provided for the M pixels $P_{1,n}$ to $P_{M,n}$ of the n-th column, and further, the column control line for applying the output signal of the inverter circuit INV2 is separately provided in addition to the column control line for applying the n-th column control signal $Y_n$.

The operations of the switches SW1 and SW2 in this circuit configuration example are the same as those in the configuration example illustrated in FIG. 10. In this circuit configuration example also, the switches SW1 and SW2 are not in the ON state at the same time, and thus, only one photodiode may be included in the pixel $P_{m,n}$. Therefore, compared to the configuration example illustrated in FIG. 6, the configuration example illustrated in FIG. 12 may also increase an area of a photosensitive region of the photodiode. Further, compared to the configuration example illustrated in FIG. 10, in the configuration example illustrated in FIG. 12, the pixel $P_{m,n}$ does not include the inverter circuit, and thus, the area of the photosensitive region of the photodiode may be further increased.

Figure 13:
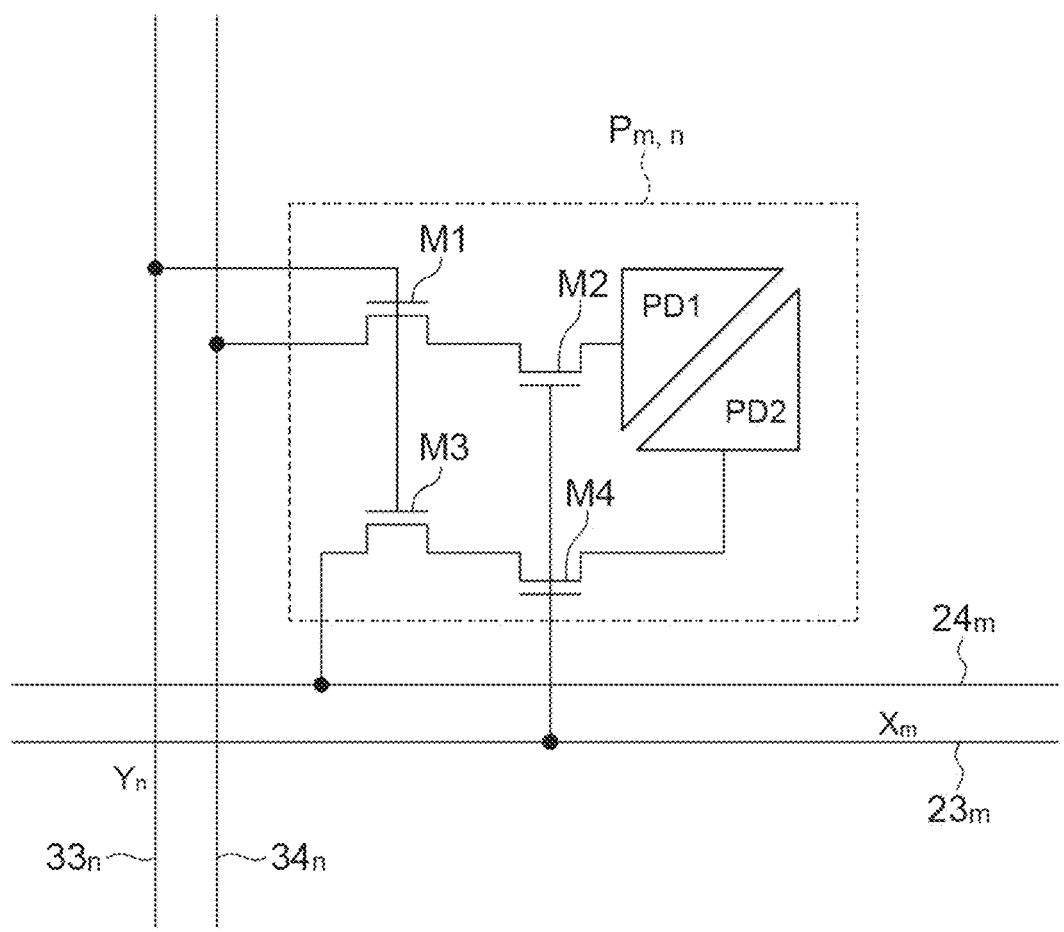
FIG. 13 is a diagram illustrating another circuit configuration example of the pixel $P_{m,n}$.

FIG. 13 is a diagram illustrating another circuit configuration example of the pixel $P_{m,n}$. The pixel $P_{m,n}$ illustrated in this diagram includes photodiodes PD1 and PD2, and NMOS transistors M1 to M4. Each of the NMOS transistors M1 to M4 operates as a switch.

The NMOS transistors M1 and M3 are in the ON state when the n-th column control signal $Y_n$ has the logical value 1, and are in the OFF state when the n-th column control signal $Y_n$ has the logical value 0. The NMOS transistors M2 and M4 are in the ON state when the m-th row control signal $X_m$ has the logical value 1, and are in the OFF state when the m-th row control signal $X_m$ has the logical value 0.

The NMOS transistors M1 and M2 are provided in series between the photodiode PD1 and the n-th column output line $34_n$, and when these are in the ON state, the charges generated in the photodiode PD1 are output to the n-th column output line $34_n$. The NMOS transistors M3 and M4 are provided in series between the photodiode PD2 and the m-th row output line $24_m$, and when these are in the ON state, the charges generated in the photodiode PD2 are output to the m-th row output line $24_m$.

An example of the charge output of the pixels in the pixel array unit 10 when the pixel $P_{m,n}$ is set as the circuit configuration example of FIG. 13 is the same as that in FIG. 7.

Figure 14:
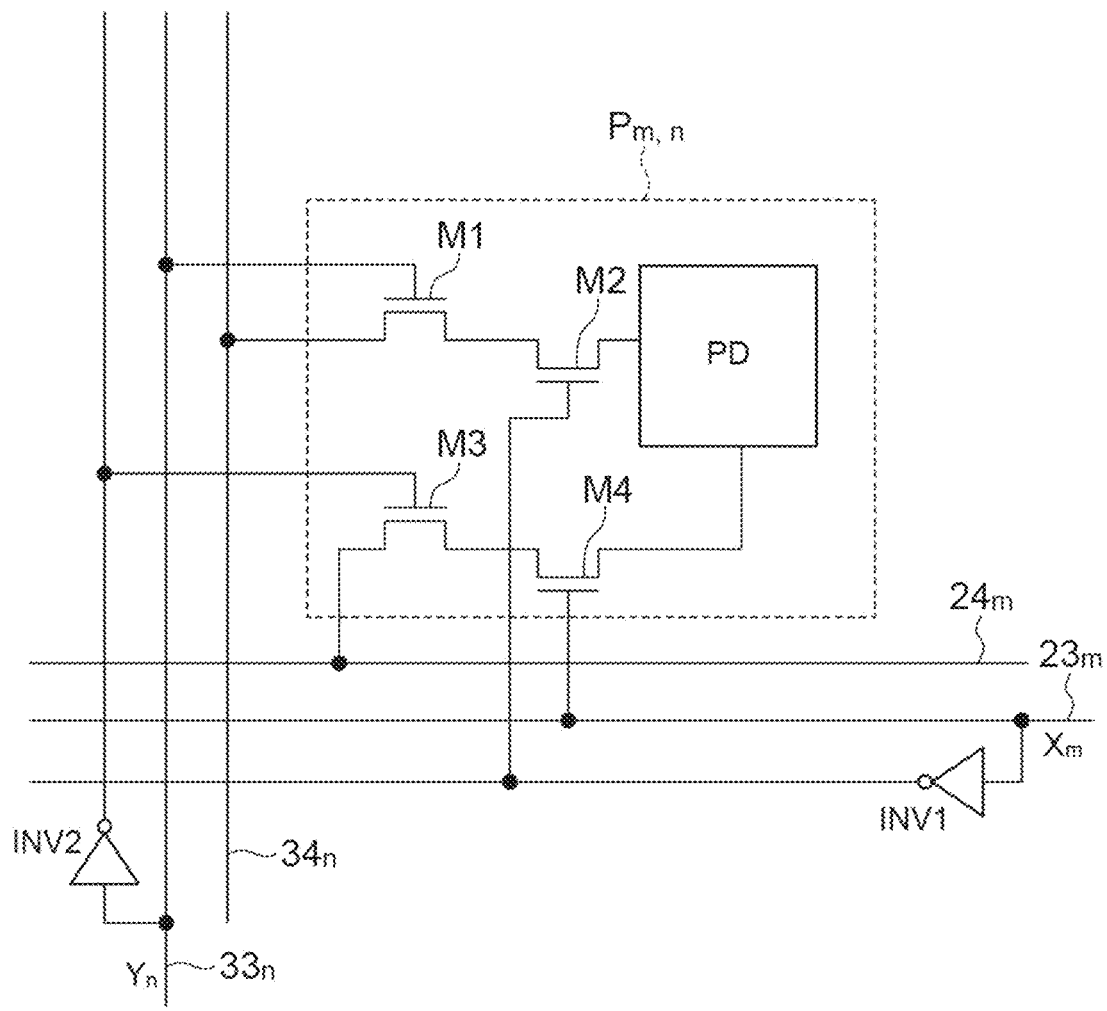
FIG. 14 is a diagram illustrating another circuit configuration example of the pixel $P_{m,n}$.

FIG. 14 is a diagram illustrating another circuit configuration example of the pixel $P_{m,n}$. The pixel $P_{m,n}$ illustrated in this diagram includes a photodiode PD, and NMOS transistors M1 to M4. Each of the NMOS transistors M1 to M4 operates as a switch.

An inverter circuit INV1 for outputting a logically inverted signal of the m-th row control signal $X_m$ is provided for the N pixels $P_{m,1}$ to $P_{m,N}$ of the m-th row, and further, the row control line for applying the output signal of the inverter circuit INV1 is separately provided in addition to the row control line for applying the m-th row control signal $X_m$.

An inverter circuit INV2 for outputting a logically inverted signal of the n-th column control signal $Y_n$ is provided for the M pixels $P_{1,n}$ to $P_{M,n}$ of the n-th column, and further, the column control line for applying the output signal of the inverter circuit INV2 is separately provided in addition to the column control line for applying the n-th column control signal $Y_n$.

The n-th column control signal $Y_n$ is input to a gate of the NMOS transistor M1. The output signal of the inverter circuit INV1 is input to a gate of the NMOS transistor M2. The NMOS transistors M1 and M2 are provided in series between the photodiode PD and the n-th column output line $34_n$, and when the m-th row control signal $X_m$ has the logical value 0 and the n-th column control signal $Y_n$ has the logical value 1, the charges generated in the photodiode PD are output to the n-th column output line $34_n$.

The output signal of the inverter circuit INV2 is input to a gate of the NMOS transistor M3. The m-th row control signal $X_m$ is input to a gate of the NMOS transistor M4. The NMOS transistors M3 and M4 are provided in series between the photodiode PD and the m-th row output line $24_m$, and when the m-th row control signal $X_m$ has the logical value 1 and the n-th column control signal $Y_n$ has the logical value 0, the charges generated in the photodiode PD are output to the m-th row output line $24_m$.

An example of the charge output of the pixels in the pixel array unit 10 when the pixel $P_{m,n}$ is set as the circuit configuration example of FIG. 14 is the same as that in FIG. 11.

FIG. 7, FIG. 9, and FIG. 11 illustrate the examples of the charge output of the pixels in the pixel array unit 10, when the circuit configuration examples of the pixel $P_{m,n}$ described above are used. In these examples of the charge output, there are the pixels which do not output the charges to the m-th row output line $24_m$ and the n-th column output line $34_n$.

However, as described next, before the pixels are reset, the row control unit 21 also outputs logically inverted signals of the first to M-th row control signals $X_1$ to $X_M$, or the column control unit 31 also outputs logically inverted signals of the first to N-th column control signals $Y_1$ to $Y_N$, so that the charges can be efficiently output from all the pixels. Further, since it is only necessary to logically invert the first to M-th row control signals $X_1$ to $X_M$ or the first to N-th column control signals $Y_1$ to $Y_N$, it is possible to save capacity for storing the patterns used for the compressive sensing technique.

FIG. 15 to FIG. 18 are diagrams illustrating an example of the charge output of the pixels in the pixel array unit 10 when the pixel $P_{m,n}$ is set as the circuit configuration example of FIG. 6. For example, in a first period, the row control unit 21 outputs [10101101] as the first to M-th row control signals $X_1$ to $X_M$, and the column control unit 31 outputs [10110010] as the first to N-th column control signals $Y_1$ to $Y_N$. The pixels which output the charges in the pixel array unit 10 in the first period are the pixels with hatching in FIG. 15.

In a second period following the first period, the row control unit 21 outputs [10101101] being the same signals as the signals of the previous period as the first to M-th row control signals $X_1$ to $X_M$, and the column control unit 31 outputs [01001101] being the logically inverted signals of [10110010] of the previous period as the first to N-th column control signals $Y_1$ to $Y_N$. The pixels which output the charges in the pixel array unit 10 in the second period are the pixels with hatching in FIG. 16.

In a third period following the second period, the row control unit 21 outputs [01010010] being the logically inverted signals of [10101101] of the previous period as the first to M-th row control signals $X_1$ to $X_M$, and the column control unit 31 outputs [01001101] being the same signals as the signals of the previous period as the first to N-th column control signals $Y_1$ to $Y_N$. The pixels which output the charges in the pixel array unit 10 in the third period are the pixels with hatching in FIG. 17.

In a fourth period following the third period, the row control unit 21 outputs [01010010] being the same signals as the signals of the previous period as the first to M-th row control signals $X_1$ to $X_M$, and the column control unit 31 outputs [10110010] being the logically inverted signals of [01001101] of the previous period as the first to N-th column control signals $Y_1$ to $Y_N$. The pixels which output the charges in the pixel array unit 10 in the fourth period are the pixels with hatching in FIG. 18.

In this way, the charges can be output from all the pixels over the first to fourth periods. In this case, various configurations can be used for timing from exposure to readout. FIG. 19 to FIG. 22 are diagrams illustrating timing configuration examples from the exposure to the readout in the case where the charges are output from all the pixels described in FIG. 15 to FIG. 18.

Figure 15:
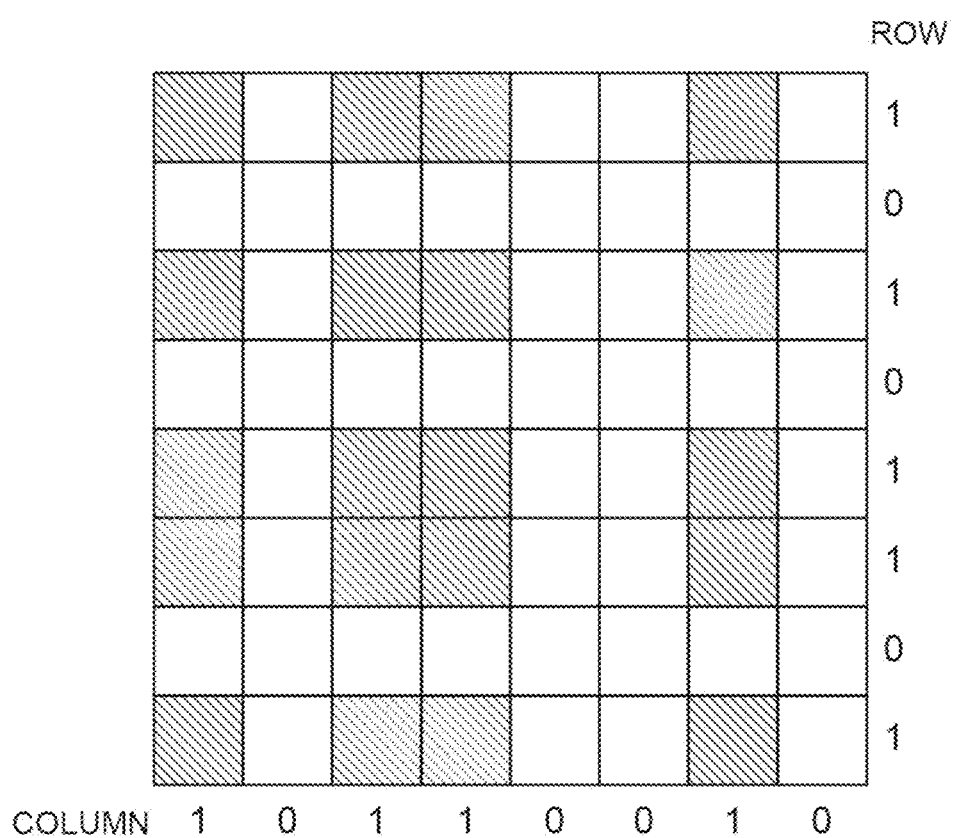
FIG. 15 is a diagram illustrating an example of charge output of each pixel in the pixel array unit 10 in a first period when the pixel $P_{m,n}$ is set as the circuit configuration example of FIG. 6.
Figure 16:
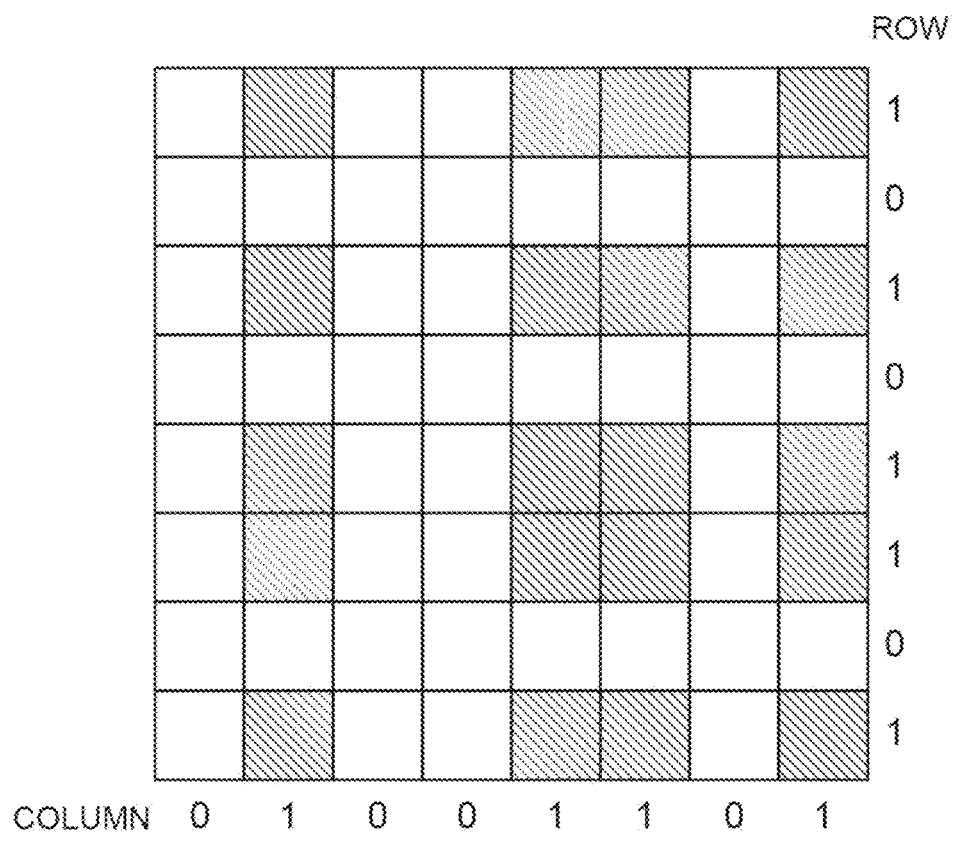
Figure 17:
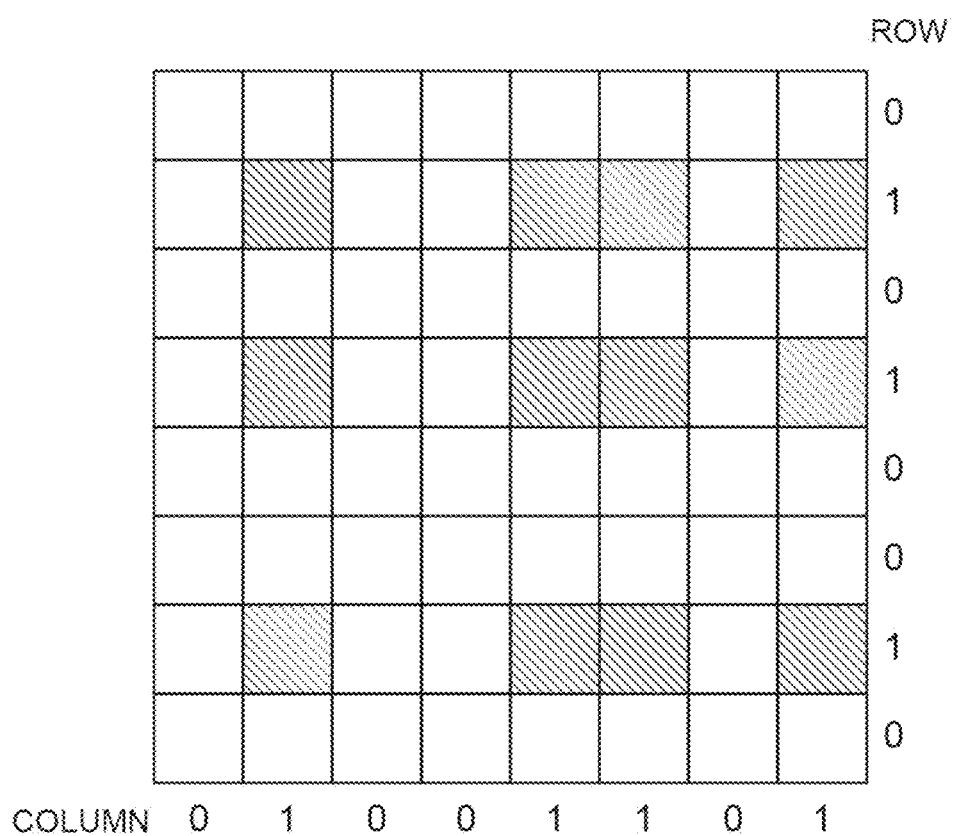
FIG. 17 is a diagram illustrating an example of charge output of each pixel in the pixel array unit 10 in a third period when the pixel $P_{m,n}$ is set as the circuit configuration example of FIG. 6.
Figure 18:
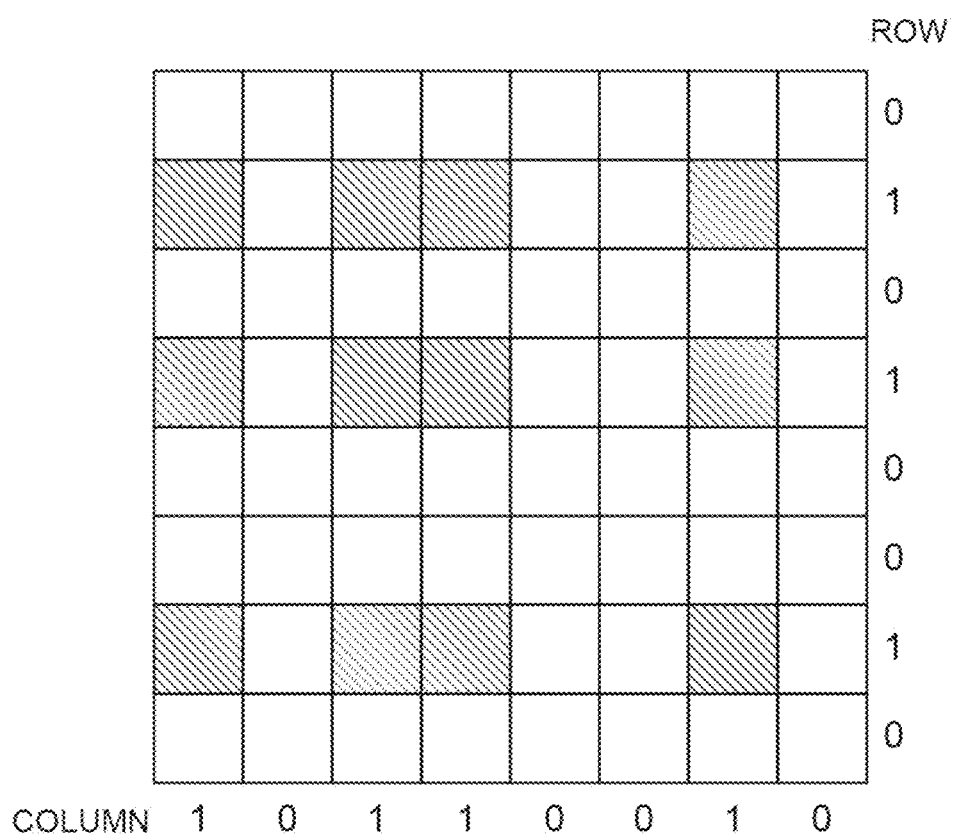
FIG. 18 is a diagram illustrating an example of charge output of each pixel in the pixel array unit 10 in a fourth period when the pixel $P_{m,n}$ is set as the circuit configuration example of FIG. 6.
Figure 19:
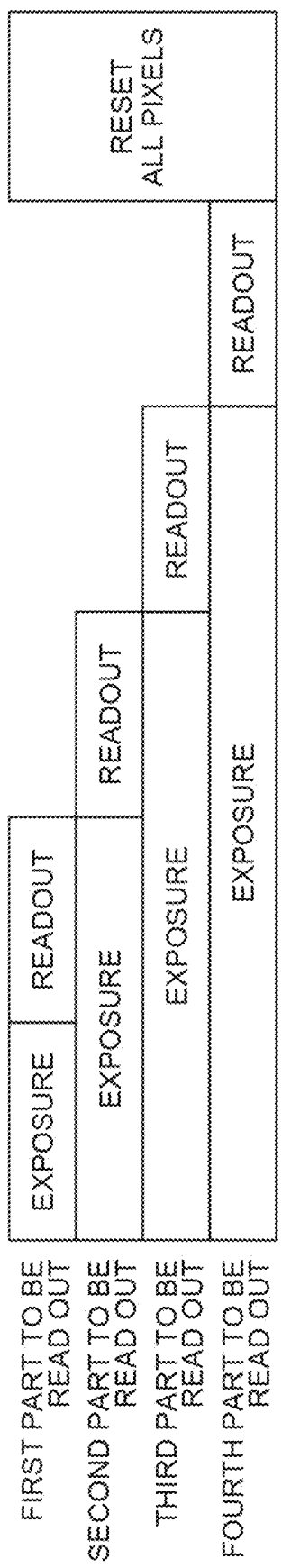
FIG. 19 is a diagram illustrating a timing configuration example from exposure to readout in the case where charges are output from all the pixels described in FIG. 15 to FIG. 18.

In the timing configuration example illustrated in FIG. 19, all the pixels start the exposure at the same time, the charges are output from the pixels with hatching in FIG. 15 in the first period after a predetermined period, the charges are output from the pixels with hatching in FIG. 16 in the second period, the charges are output from the pixels with hatching in FIG. 17 in the third period, and the charges are output from the pixels with hatching in FIG. 18 in the fourth period.

Although the exposure time varies depending on the period of outputting the charges in the first to fourth periods, the difference in exposure time can be easily corrected when solving the optimization problem according to the compressive sensing technique. This timing configuration may be applied to the case with the circuit configuration example of the column readout unit 32 illustrated in FIG. 2 and the similar circuit configuration example of the row readout unit 22.

Figure 20:
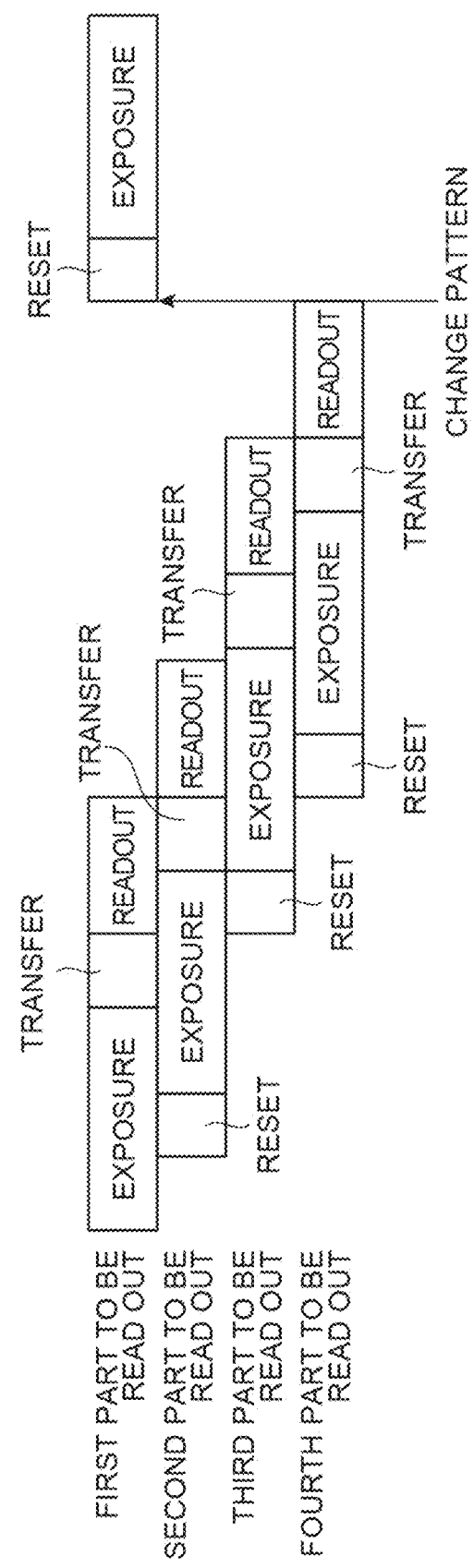
FIG. 20 is a diagram illustrating a timing configuration example from exposure to readout in the case where charges are output from all the pixels described in FIG. 15 to FIG. 18.

In the timing configuration example illustrated in FIG. 20, the exposure time of all the pixels is made constant by performing reset of each pixel at appropriate timing. The charges are transferred from the pixels with hatching in FIG. 15 to the row readout unit 22 or the column readout unit 32, and then the digital value according to the charge amount is output from the row readout unit 22 or the column readout unit 32. When the charge transfer is completed for these pixels, the charges are transferred from the pixels with hatching in FIG. 16 to the row readout unit 22 or the column readout unit 32, and then the digital value according to the charge amount is output from the row readout unit 22 or the column readout unit 32.

When the charge transfer is completed for these pixels, the charges are transferred from the pixels with hatching in FIG. 17 to the row readout unit 22 or the column readout unit 32, and then the digital value according to the charge amount is output from the row readout unit 22 or the column readout unit 32. When the charge transfer is completed for these pixels, the charges are transferred from the pixels with hatching in FIG. 18 to the row readout unit 22 or the column readout unit 32, and then the digital value according to the charge amount is output from the row readout unit 22 or the column readout unit 32.

This timing configuration may be applied to the case with the circuit configuration example of the column readout unit 32 illustrated in FIG. 4 and the similar circuit configuration example of the row readout unit 22. In this case, the two capacitors are provided for each row in the row readout unit 22, and the two capacitors are provided for each column in the column readout unit 32, and thus, the charge transfer from the pixel to one capacitor and the charge transfer from the other capacitor to the conversion unit 49 can be performed in parallel.

Figure 21:
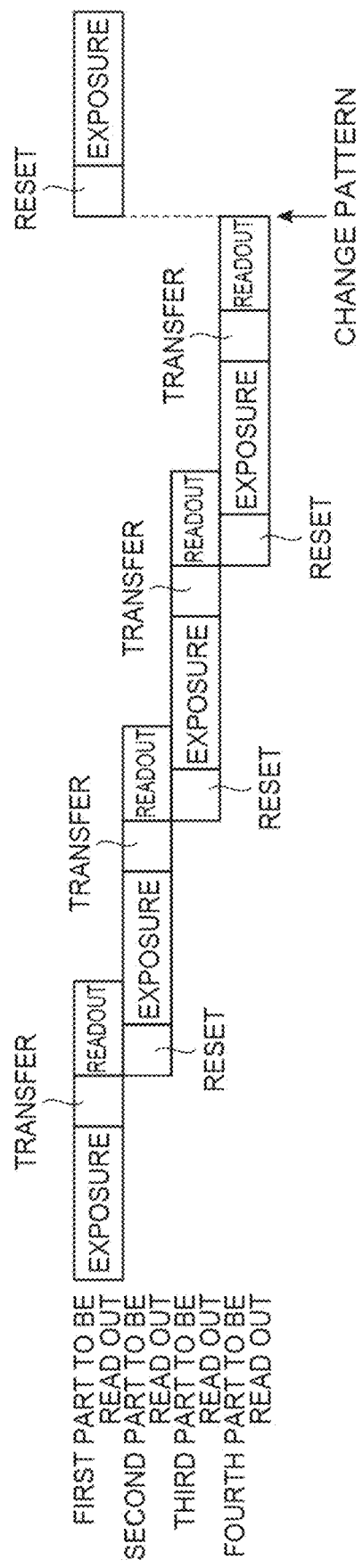
FIG. 21 is a diagram illustrating a timing configuration example from exposure to readout in the case where charges are output from all the pixels described in FIG. 15 to FIG. 18.

In the timing configuration example illustrated in FIG. 21 also, the exposure time of all the pixels is made constant by performing reset of each pixel at appropriate timing. After the reset and the exposure of a predetermined period are performed in the pixels with hatching in FIG. 15, the charges are transferred from these pixels to the row readout unit 22 or the column readout unit 32, and then the digital value according to the charge amount is output from the row readout unit 22 or the column readout unit 32. When the charge transfer is completed for these pixels, after the reset and the exposure of the predetermined period are performed in the pixels with hatching in FIG. 16, the charges are transferred from these pixels to the row readout unit 22 or the column readout unit 32, and then the digital value according to the charge amount is output from the row readout unit 22 or the column readout unit 32.

When the charge transfer is completed for these pixels, after the reset and the exposure of the predetermined period are performed in the pixels with hatching in FIG. 17, the charges are transferred from these pixels to the row readout unit 22 or the column readout unit 32, and then the digital value according to the charge amount is output from the row readout unit 22 or the column readout unit 32. When the charge transfer is completed for these pixels, after the reset and the exposure of the predetermined period are performed in the pixels with hatching in FIG. 18, the charges are transferred from these pixels to the row readout unit 22 or the column readout unit 32, and then the digital value according to the charge amount is output from the row readout unit 22 or the column readout unit 32.

This timing configuration may be applied to the case with the circuit configuration example of the column readout unit 32 illustrated in FIG. 3 and the similar circuit configuration example of the row readout unit 22. In this case, the one capacitor is provided for each row in the row readout unit 22, and the one capacitor is provided for each column in the column readout unit 32, and thus, it can be applied regardless of the readout time and the exposure time.

Figure 22:
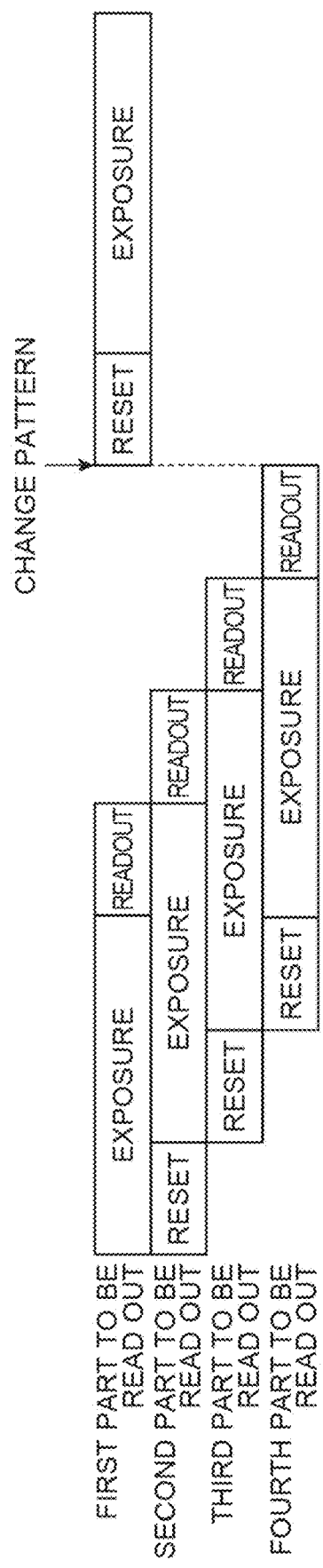
FIG. 22 is a diagram illustrating a timing configuration example from exposure to readout in the case where charges are output from all the pixels described in FIG. 15 to FIG. 18.

In the timing configuration example illustrated in FIG. 22 also, the exposure time of all the pixels is made constant by performing reset of each pixel at appropriate timing. For the pixels with hatching in FIG. 15, the digital value according to the charge amount is output from the row readout unit 22 or the column readout unit 32. When the readout is completed for these pixels, for the pixels with hatching in FIG. 16, the digital value according to the charge amount is output from the row readout unit 22 or the column readout unit 32.

When the readout is completed for these pixels, for the pixels with hatching in FIG. 17, the digital value according to the charge amount is output from the row readout unit 22 or the column readout unit 32. When the readout is completed for these pixels, for the pixels with hatching in FIG. 18, the digital value according to the charge amount is output from the row readout unit 22 or the column readout unit 32.

This timing configuration may be applied to the case with the circuit configuration example of the column readout unit 32 illustrated in FIG. 2 and the similar circuit configuration example of the row readout unit 22. It can be applied when the readout time is ⅓ or less of the exposure time.

Figure 23:
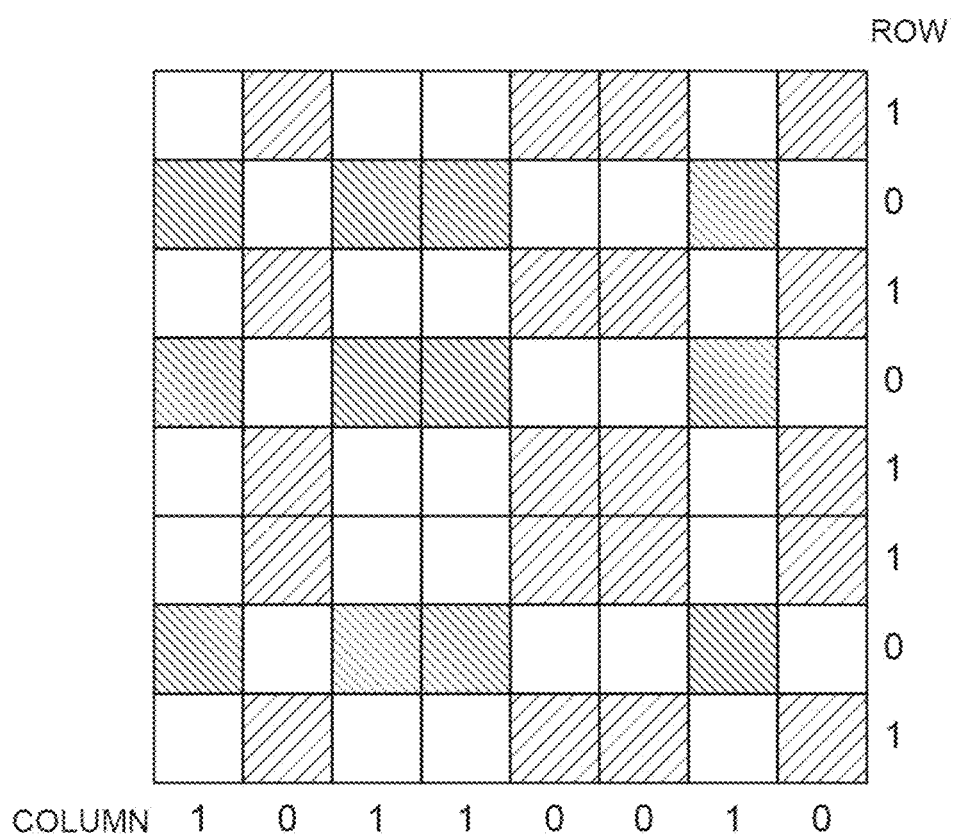
FIG. 23 is a diagram illustrating an example of charge output of each pixel in the pixel array unit 10 in the first period when the pixel $P_{m,n}$ is set as the circuit configuration example of FIG. 10 or FIG. 12.
Figure 24:
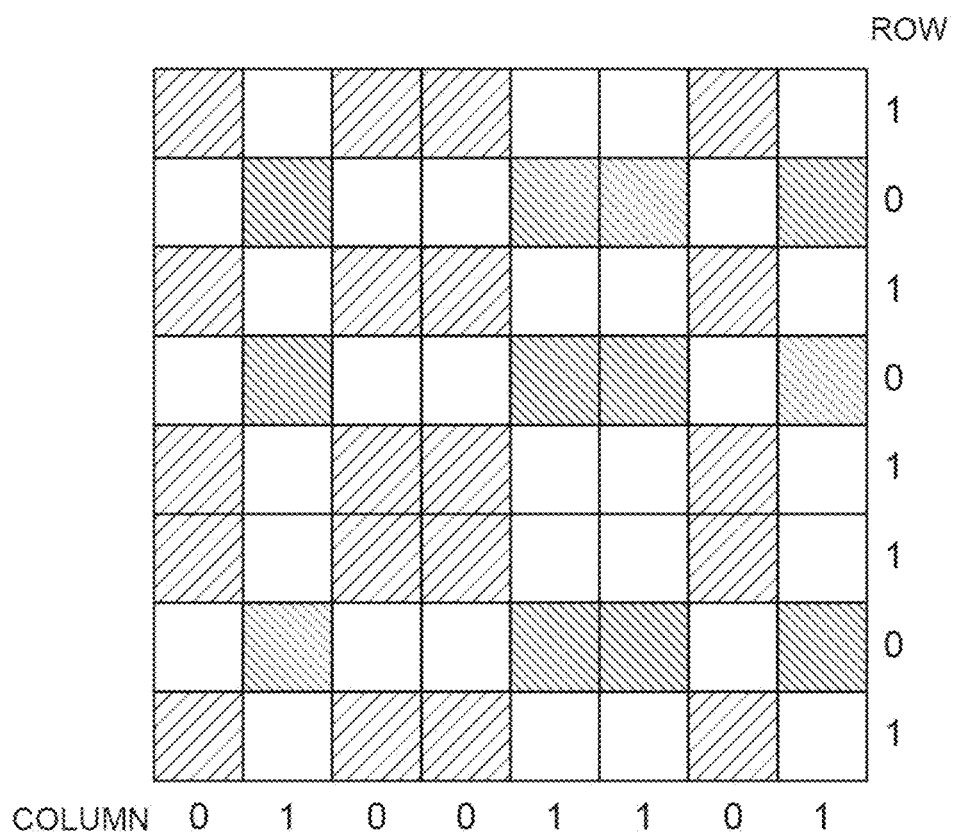
FIG. 24 is a diagram illustrating an example of charge output of each pixel in the pixel array unit 10 in the second period when the pixel $P_{m,n}$ is set as the circuit configuration example of FIG. 10 or FIG. 12.

FIG. 23 and FIG. 24 are diagrams illustrating an example of the charge output of the pixels in the pixel array unit 10 when the pixel $P_{m,n}$ is set as the circuit configuration example of FIG. 10 or FIG. 12. For example, in a first period, the row control unit 21 outputs [10101101] as the first to M-th row control signals $X_1$ to $X_M$, and the column control unit 31 outputs [10110010] as the first to N-th column control signals $Y_1$ to $Y_N$.

The pixels which output the charges in the pixel array unit 10 in the first period are the pixels with hatching in FIG. 23. In these pixels, each of the pixels with first type hatching outputs the charges generated in the photodiode PD to the n-th column output line $34_n$, and each of the pixels with second type hatching outputs the charges generated in the photodiode PD to the m-th row output line $24_m$. Each of the other pixels does not output the charges to the m-th row output line $24_m$ and the n-th column output line $34_n$.

In a second period following the first period, the row control unit 21 outputs [10101101] being the same signals as the signals of the previous period as the first to M-th row control signals $X_1$ to $X_M$, and the column control unit 31 outputs [01001101] being the logically inverted signals of [10110010] of the previous period as the first to N-th column control signals $Y_1$ to $Y_N$.

The pixels which output the charges in the pixel array unit 10 in the second period are the pixels with hatching in FIG. 24. In these pixels, each of the pixels with first type hatching outputs the charges generated in the photodiode PD to the n-th column output line $34_n$, and each of the pixels with second type hatching outputs the charges generated in the photodiode PD to the m-th row output line $24_m$. Each of the other pixels does not output the charges to the m-th row output line $24_m$ and the n-th column output line $34_n$.

In this way, the charges can be output from all the pixels over the first and second periods. In this case, various configurations can be used for timing from exposure to readout. FIG. 25 to FIG. 28 are diagrams illustrating timing configuration examples from the exposure to the readout in the case where the charges are output from all the pixels described in FIG. 23 and FIG. 24.

Figure 25:
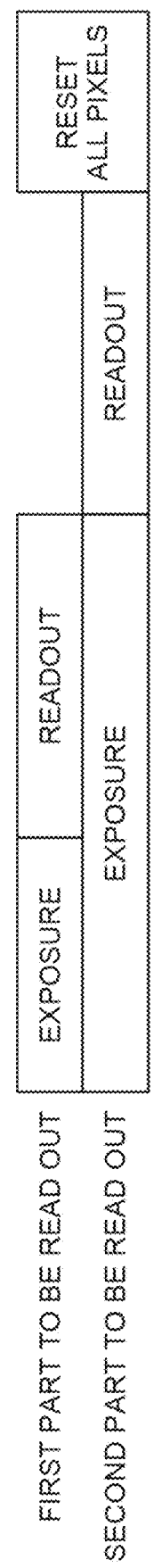
FIG. 25 is a diagram illustrating a timing configuration example from exposure to readout in the case where charges are output from all the pixels described in FIG. 23 and FIG. 24.

In the timing configuration example illustrated in FIG. 25, all the pixels start the exposure at the same time, the charges are output from the pixels with hatching in FIG. 23 in the first period after a predetermined period, and the charges are output from the pixels with hatching in FIG. 24 in the second period. Although the exposure time varies depending on the period of outputting the charges in the first and second periods, the difference in exposure time can be easily corrected when solving the optimization problem according to the compressive sensing technique.

This timing configuration may be applied to the case with the circuit configuration example of the column readout unit 32 illustrated in FIG. 2 and the similar circuit configuration example of the row readout unit 22.

Figure 26:
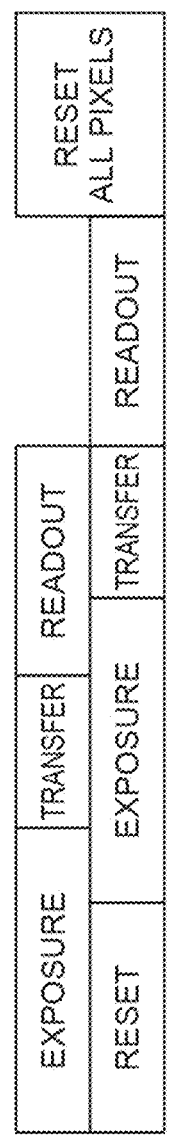
FIG. 26 is a diagram illustrating a timing configuration example from exposure to readout in the case where charges are output from all the pixels described in FIG. 23 and FIG. 24.

In the timing configuration example illustrated in FIG. 26, the exposure time of all the pixels is made constant by performing reset of each pixel at appropriate timing. The charges are transferred from the pixels with hatching in FIG. 23 to the row readout unit 22 or the column readout unit 32, and then the digital value according to the charge amount is output from the row readout unit 22 or the column readout unit 32. When the charge transfer is completed for these pixels, the charges are transferred from the pixels with hatching in FIG. 24 to the row readout unit 22 or the column readout unit 32, and then the digital value according to the charge amount is output from the row readout unit 22 or the column readout unit 32.

This timing configuration may be applied to the case with the circuit configuration example of the column readout unit 32 illustrated in FIG. 4 and the similar circuit configuration example of the row readout unit 22. In this case, the two capacitors are provided for each row in the row readout unit 22, and the two capacitors are provided for each column in the column readout unit 32, and thus, the charge transfer from the pixel to one capacitor and the charge transfer from the other capacitor to the conversion unit 49 can be performed in parallel.

Figure 27:
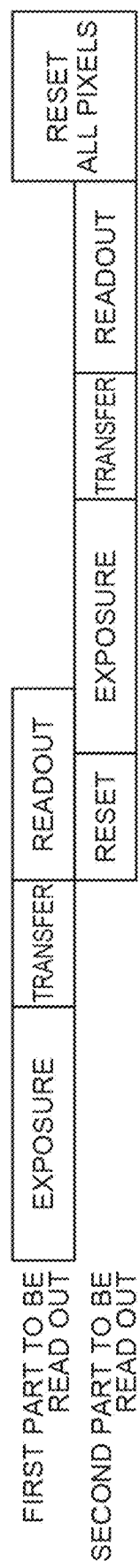
FIG. 27 is a diagram illustrating a timing configuration example from exposure to readout in the case where charges are output from all the pixels described in FIG. 23 and FIG. 24.

In the timing configuration example illustrated in FIG. 27 also, the exposure time of all the pixels is made constant by performing reset of each pixel at appropriate timing. After the reset and the exposure of a predetermined period are performed in the pixels with hatching in FIG. 23, the charges are transferred from these pixels to the row readout unit 22 or the column readout unit 32, and then the digital value according to the charge amount is output from the row readout unit 22 or the column readout unit 32. When the charge transfer is completed for these pixels, after the reset and the exposure of the predetermined period are performed in the pixels with hatching in FIG. 24, the charges are transferred from these pixels to the row readout unit 22 or the column readout unit 32, and then the digital value according to the charge amount is output from the row readout unit 22 or the column readout unit 32.

This timing configuration may be applied to the case with the circuit configuration example of the column readout unit 32 illustrated in FIG. 3 and the similar circuit configuration example of the row readout unit 22. In this case, the one capacitor is provided for each row in the row readout unit 22 and the one capacitor is provided for each column in the column readout unit 32, and thus, it can be applied regardless of the readout time and the exposure time.

Figure 28:
FIG. 28 is a diagram illustrating a timing configuration example from exposure to readout in the case where charges are output from all the pixels described in FIG. 23 and FIG. 24.

In the timing configuration example illustrated in FIG. 28 also, the exposure time of all the pixels is made constant by performing reset of each pixel at appropriate timing. For the pixels with hatching in FIG. 23, the digital value according to the charge amount is output from the row readout unit 22 or the column readout unit 32. When the readout is completed for these pixels, for the pixels with hatching in FIG. 24, the digital value according to the charge amount is output from the row readout unit 22 or the column readout unit 32.

This timing configuration may be applied to the case with the circuit configuration example of the column readout unit 32 illustrated in FIG. 2 and the similar circuit configuration example of the row readout unit 22. It can be applied when the readout time is the exposure time or less.

In the embodiments described above with reference to FIG. 15 to FIG. 28, the charges can be efficiently output from all the pixels by logically inverting the first to M-th row control signals $X_1$ to $X_M$ or the first to N-th column control signals $Y_1$ to $Y_N$ before the pixels are reset. In addition, when a circuit configuration example of the pixel $P_{m,n}$ described below is used, the charges can be efficiently output from all the pixels by using one set of the first to M-th row control signals $X_1$ to $X_M$ and the first to N-th column control signals $Y_1$ to $Y_N$.

Figure 29:
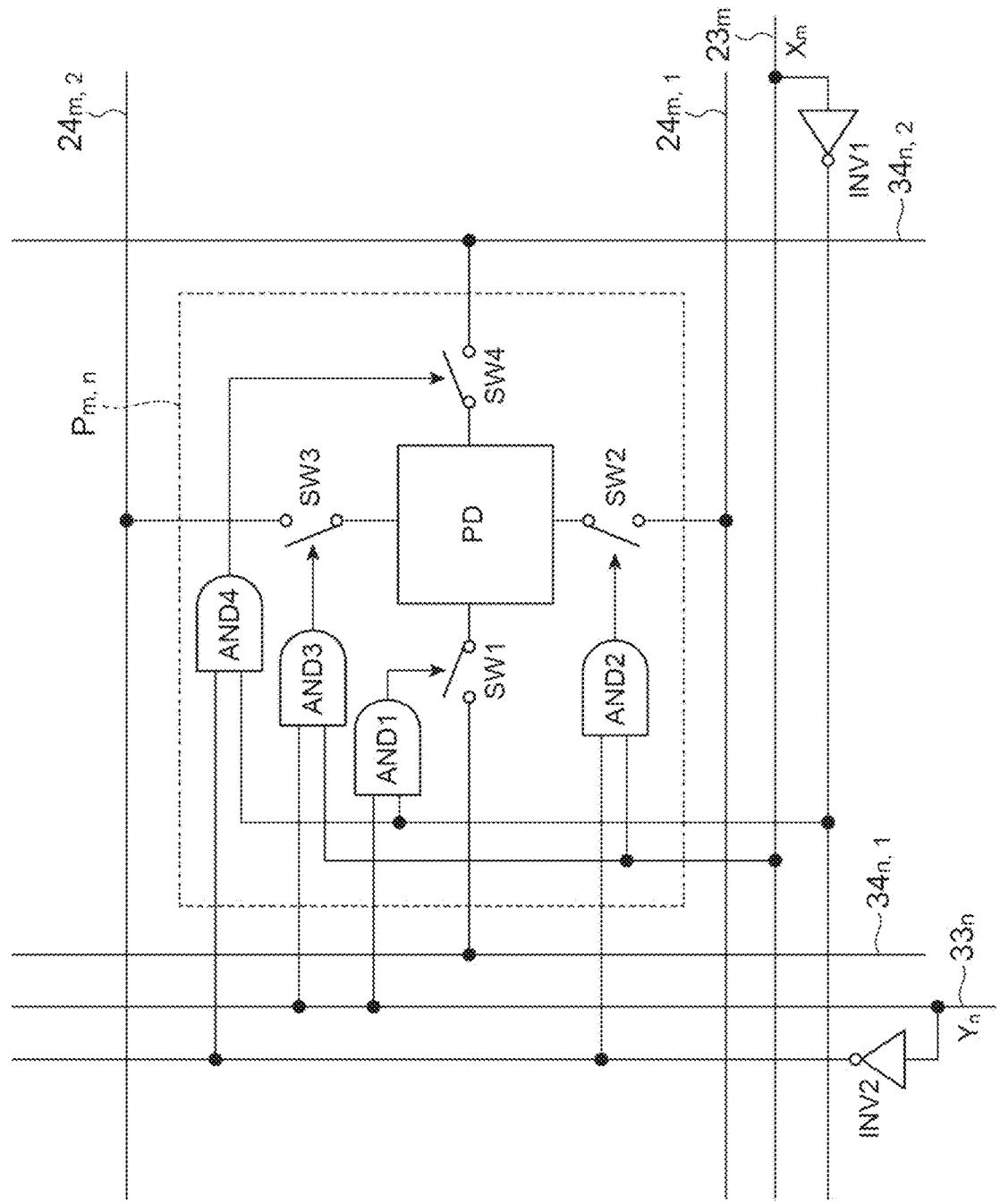
FIG. 29 is a diagram illustrating another circuit configuration example of the pixel $P_{m,n}$.

FIG. 29 is a diagram illustrating another circuit configuration example of the pixel $P_{m,n}$. The pixel $P_{m,n}$ illustrated in this diagram includes a photodiode PD, switches SW1 to SW4, and AND circuits AND1 to AND4.

An inverter circuit INV1 for outputting a logically inverted signal of the m-th row control signal $X_m$ is provided for the N pixels $P_{m,1}$ to $P_{m,N}$ of the m-th row, and further, the row control line for applying the output signal of the inverter circuit INV1 is separately provided in addition to the row control line for applying the m-th row control signal $X_m$. Further, for the N pixels $P_{m,1}$ to $P_{m,N}$ of the m-th row, a row output line $24_{m,1}$ and a row output line $24_{m,2}$ are provided as the m-th row output line $24_m$.

An inverter circuit INV2 for outputting a logically inverted signal of the n-th column control signal $Y_n$ is provided for the M pixels $P_{1,n}$ to $P_{M,n}$ of the n-th column, and further, the column control line for applying the output signal of the inverter circuit INV2 is separately provided in addition to the column control line for applying the n-th column control signal $Y_n$. Further, for the M pixels $P_{1,n}$ to $P_{M,n}$ of the n-th column, a column output line $34_{n,1}$ and a column output line $34_{n,2}$ are provided as the n-th column output line $34_n$.

The AND circuit AND1 inputs the output signal of the inverter circuit INV1 and the n-th column control signal $Y_n$, sets the switch SW1 to the ON state when both the signals have the logical value 1, and sets the switch SW1 to the OFF state otherwise. That is, when the m-th row control signal $X_m$ has the logical value 0 and the n-th column control signal $Y_n$ has the logical value 1, the AND circuit AND1 sets the switch SW1 to the ON state. The switch SW1 is provided between the photodiode PD and the column output line $34_{n,1}$, and when it is in the ON state, the charges generated in the photodiode PD are output to the column output line $34_{n,1}$.

The AND circuit AND2 inputs the m-th row control signal $X_m$ and the output signal of the inverter circuit INV2, sets the switch SW2 to the ON state when both the signals have the logical value 1, and sets the switch SW2 to the OFF state otherwise. That is, when the m-th row control signal $X_m$ has the logical value 1 and the n-th column control signal $Y_n$ has the logical value 0, the AND circuit AND2 sets the switch SW2 to the ON state. The switch SW2 is provided between the photodiode PD and the row output line $24_{m,1}$, and when it is in the ON state, the charges generated in the photodiode PD are output to the row output line $24_{m,1}$.

The AND circuit AND3 inputs the m-th row control signal $X_m$ and the n-th column control signal $Y_n$, sets the switch SW3 to the ON state when both the signals have the logical value 1, and sets the switch SW3 to the OFF state otherwise. That is, when both the m-th row control signal $X_m$ and the n-th column control signal $Y_n$ have the logical value 1, the AND circuit AND3 sets the switch SW3 to the ON state. The switch SW3 is provided between the photodiode PD and the row output line $24_{m,2}$, and when it is in the ON state, the charges generated in the photodiode PD are output to the row output line $24_{m,2}$.

The AND circuit AND4 inputs the output signal of the inverter circuit INV1 and the output signal of the inverter circuit INV2, sets the switch SW4 to the ON state when both the signals have the logical value 1, and sets the switch SW4 to the OFF state otherwise. That is, when both the m-th row control signal $X_m$ and the n-th column control signal $Y_n$ have the logical value 0, the AND circuit AND4 sets the switch SW4 to the ON state. The switch SW4 is provided between the photodiode PD and the column output line $34_{n,2}$, and when it is in the ON state, the charges generated in the photodiode PD are output to the column output line $34_{n,2}$.

Figure 30:
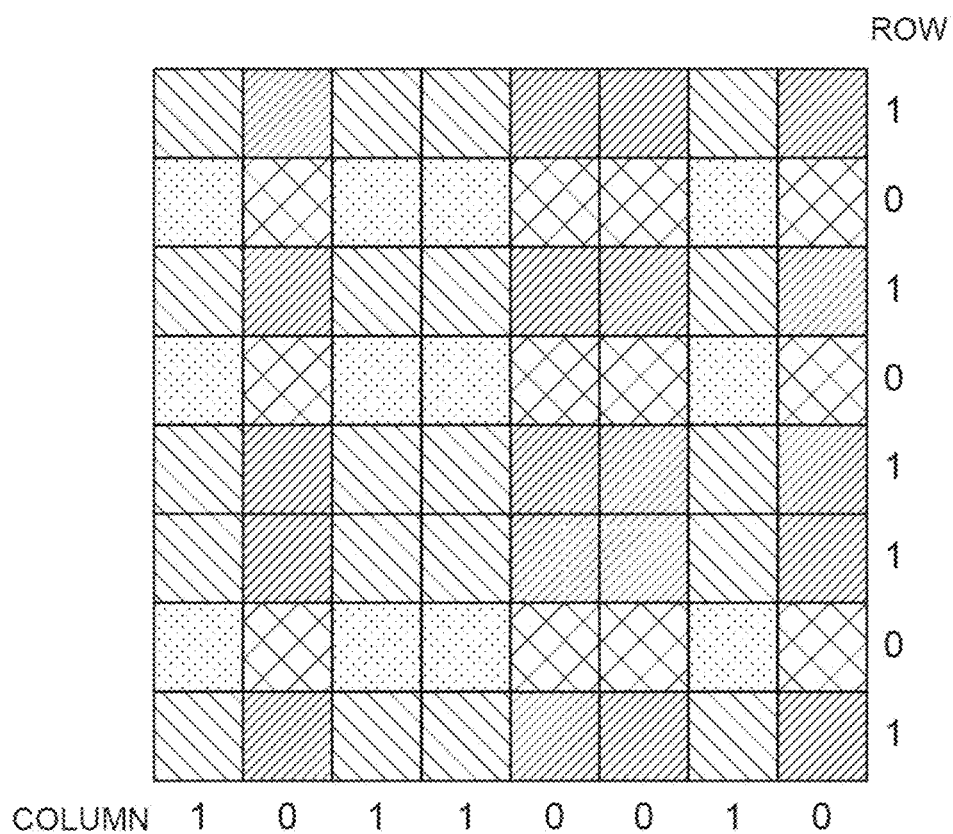
FIG. 30 is a diagram illustrating an example of charge output of each pixel in the pixel array unit 10 when the pixel $P_{m,n}$ is set as the circuit configuration example of FIG. 29.

FIG. 30 is a diagram illustrating an example of the charge output of the pixels in the pixel array unit 10 when the pixel $P_{m,n}$ is set as the circuit configuration example of FIG. 29.

In this diagram also, each of rectangular regions of 8 rows and 8 columns illustrates a pixel. Each of the pixels with first type hatching outputs the charges generated in the photodiode PD to the column output line $34_{n,1}$, each of the pixels with second type hatching outputs the charges generated in the photodiode PD to the row output line $24_{m,1}$, each of the pixels with third type hatching outputs the charges generated in the photodiode PD to the row output line $24_{m,2}$, and each of the pixels with fourth type hatching outputs the charges generated in the photodiode PD to the column output line $34_{n,2}$. In this way, the charges can be output from all the pixels.

Figure 31:
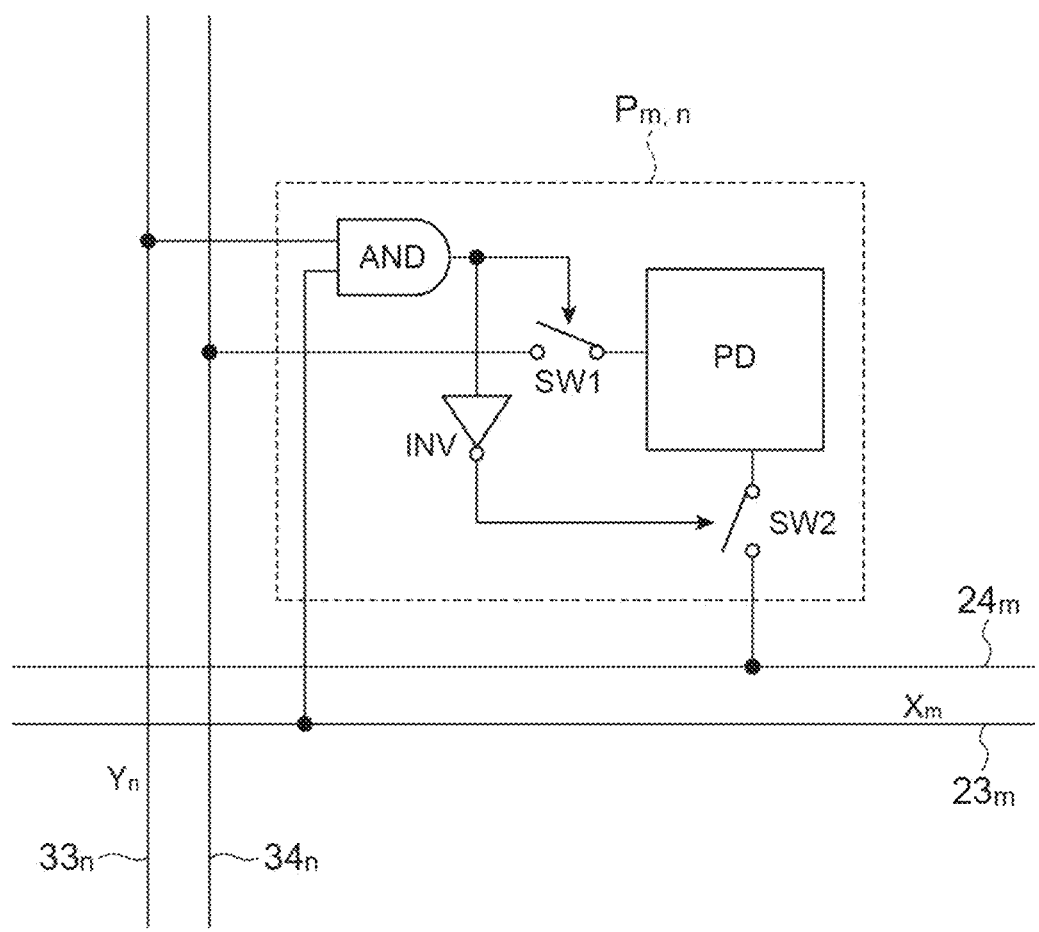
FIG. 31 is a diagram illustrating another circuit configuration example of the pixel $P_{m,n}$.

FIG. 31 is a diagram illustrating another circuit configuration example of the pixel $P_{m,n}$. The pixel $P_{m,n}$ illustrated in this diagram includes a photodiode PD, switches SW1, SW2, an AND circuit AND, and an inverter circuit INV.

The AND circuit AND inputs the m-th row control signal $X_m$ and the n-th column control signal $Y_n$, sets the switch SW1 to the ON state when both the signals have the logical value 1, and sets the switch SW1 to the OFF state otherwise. The switch SW1 is provided between the photodiode PD and the n-th column output line $34_n$, and when it is in the ON state, the charges generated the photodiode PD are output to the n-th column output line $34_n$.

The inverter circuit INV inputs the output signal of the AND circuit AND, sets the switch SW2 to the ON state when the output signal of the AND circuit AND has the logical value 0, and sets the switch SW2 to the OFF state otherwise. The switch SW2 is provided between the photodiode PD and the m-th row output line $24_m$, and when it is in the ON state, the charges generated in the photodiode PD are output to the m-th row output line $24_m$.

In this circuit configuration example, any one of the switches SW1 and SW2 is in the ON state.

Figure 32:
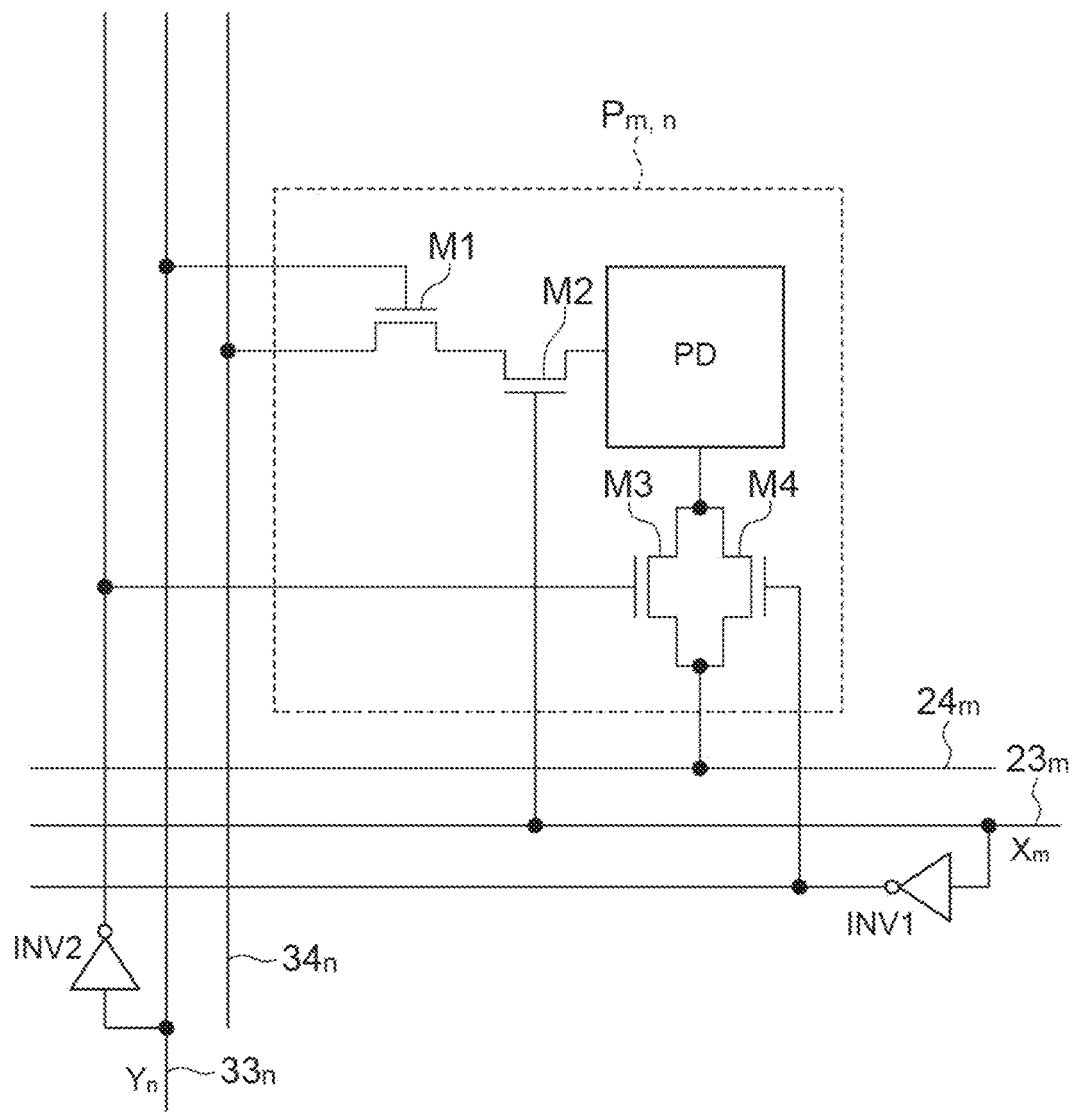
FIG. 32 is a diagram illustrating another circuit configuration example of the pixel $P_{m,n}$.

FIG. 32 is a diagram illustrating another circuit configuration example of the pixel $P_{m,n}$. The pixel $P_{m,n}$ illustrated in this diagram includes a photodiode PD, and NMOS transistors M1 to M4. Each of the NMOS transistors M1 to M4 operates as a switch.

The NMOS transistor M1 is in the ON state when the n-th column control signal $Y_n$ has the logical value 1, and is in the OFF state when the n-th column control signal $Y_n$ has the logical value 0. The NMOS transistor M2 is in the ON state when the m-th row control signal $X_m$ has the logical value 1, and is in the OFF state when the m-th row control signal $X_m$ has the logical value 0. The NMOS transistors M1 and M2 are provided in series between the photodiode PD and the n-th column output line $34_n$, and when these are in the ON state, the charges generated in the photodiode PD are output to the n-th column output line $34_n$.

The NMOS transistor M3 is in the ON state when the n-th column control signal $Y_n$ has the logical value 0, and is in the OFF state when the n-th column control signal $Y_n$ has the logical value 1. The NMOS transistor M4 is in the ON state when the m-th row control signal $X_m$ has the logical value 0, and is in the OFF state when the m-th row control signal $X_m$ has the logical value 1. The NMOS transistors M3 and M4 are provided in parallel between the photodiode PD and the m-th row output line $24_m$, and when at least one is in the ON state, the charges generated in the photodiode PD are output to the m-th row output line $24_m$.

In this circuit configuration example, any one of the unit of the NMOS transistors M1 and M2 connected in series and the unit of the NMOS transistors M3 and M4 connected in parallel is in the ON state.

Figure 33:
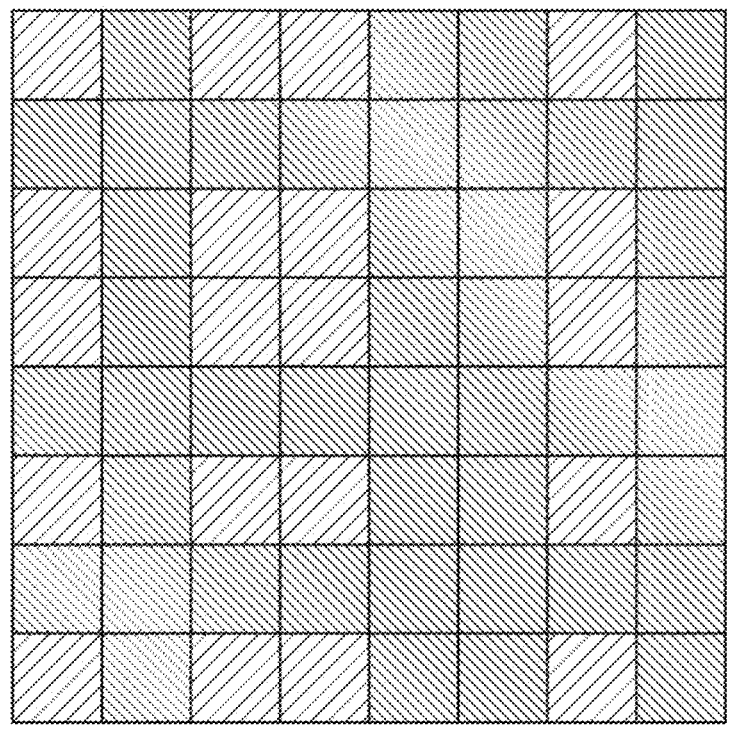
FIG. 33 is a diagram illustrating an example of charge output of each pixel in the pixel array unit 10 when the pixel $P_{m,n}$ is set as the circuit configuration example of FIG. 31 or FIG. 32.

FIG. 33 is a diagram illustrating an example of the charge output of the pixels in the pixel array unit 10 when the pixel $P_{m,n}$ is set as the circuit configuration example of FIG. 31 or FIG. 32. In this diagram also, each of rectangular regions of 8 rows and 8 columns illustrates a pixel. Each of the pixels with first type hatching outputs the charges generated in the photodiode PD to the column output line $34_n$, and each of the pixels with second type hatching outputs the charges generated in the photodiode PD to the row output line $24_m$. In this way, the charges can be output from all the pixels.

Figure 34:
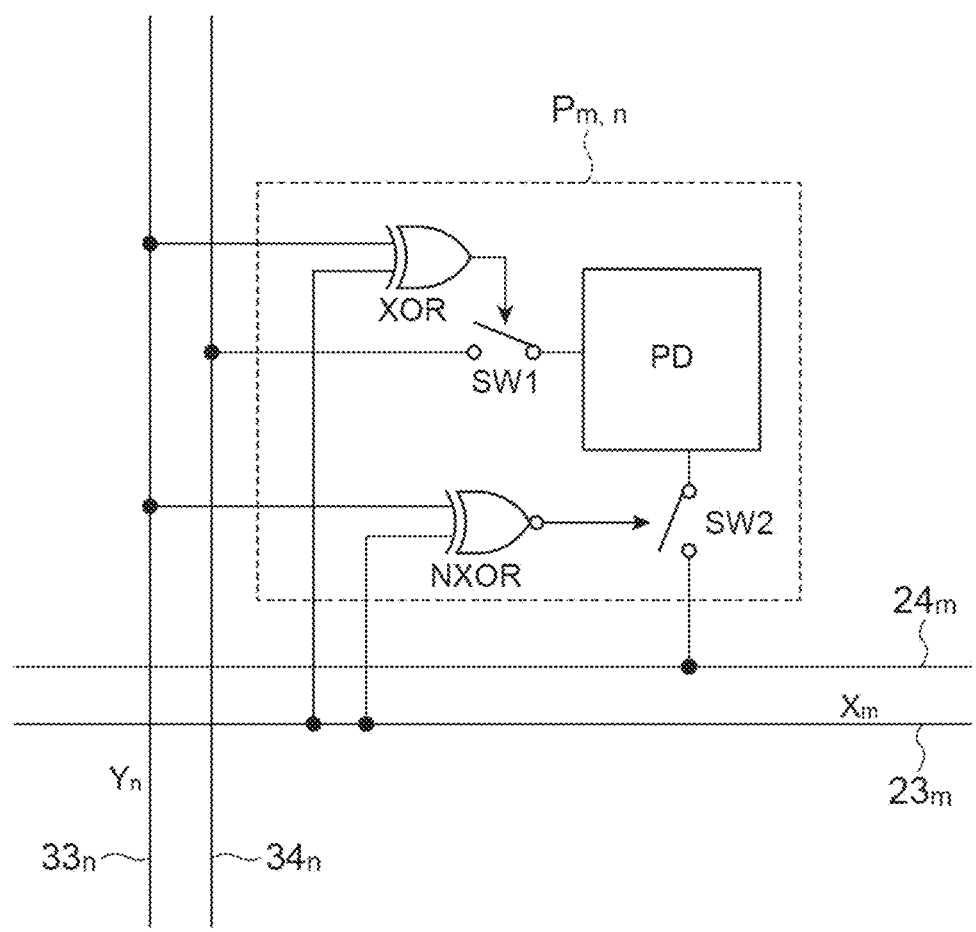
FIG. 34 is a diagram illustrating another circuit configuration example of the pixel $P_{m,n}$.

FIG. 34 is a diagram illustrating another circuit configuration example of the pixel $P_{m,n}$. The pixel $P_{m,n}$ illustrated in this diagram includes a photodiode PD, switches SW1, SW2, an exclusive OR circuit XOR, and an exclusive NOR circuit NXOR.

The exclusive OR circuit XOR inputs the m-th row control signal $X_m$ and the n-th column control signal $Y_n$, sets the switch SW1 to the ON state when the logical values of the signals are different, and sets the switch SW1 to the OFF state otherwise. The switch SW1 is provided between the photodiode PD and the n-th column output line $34_n$, and when it is in the ON state, the charges generated the photodiode PD are output to the n-th column output line $34_n$.

The exclusive NOR circuit NXOR inputs the m-th row control signal $X_m$ and the n-th column control signal $Y_n$, sets the switch SW2 to the ON state when the logical values of the signals are the same, and sets the switch SW2 to the OFF state otherwise. The switch SW2 is provided between the photodiode PD and the m-th row output line $24_m$, and when it is in the ON state, the charges generated in the photodiode PD are output to the m-th row output line $24_m$.

In this circuit configuration example also, any one of the switches SW1 and SW2 is in the ON state.

Figure 35:
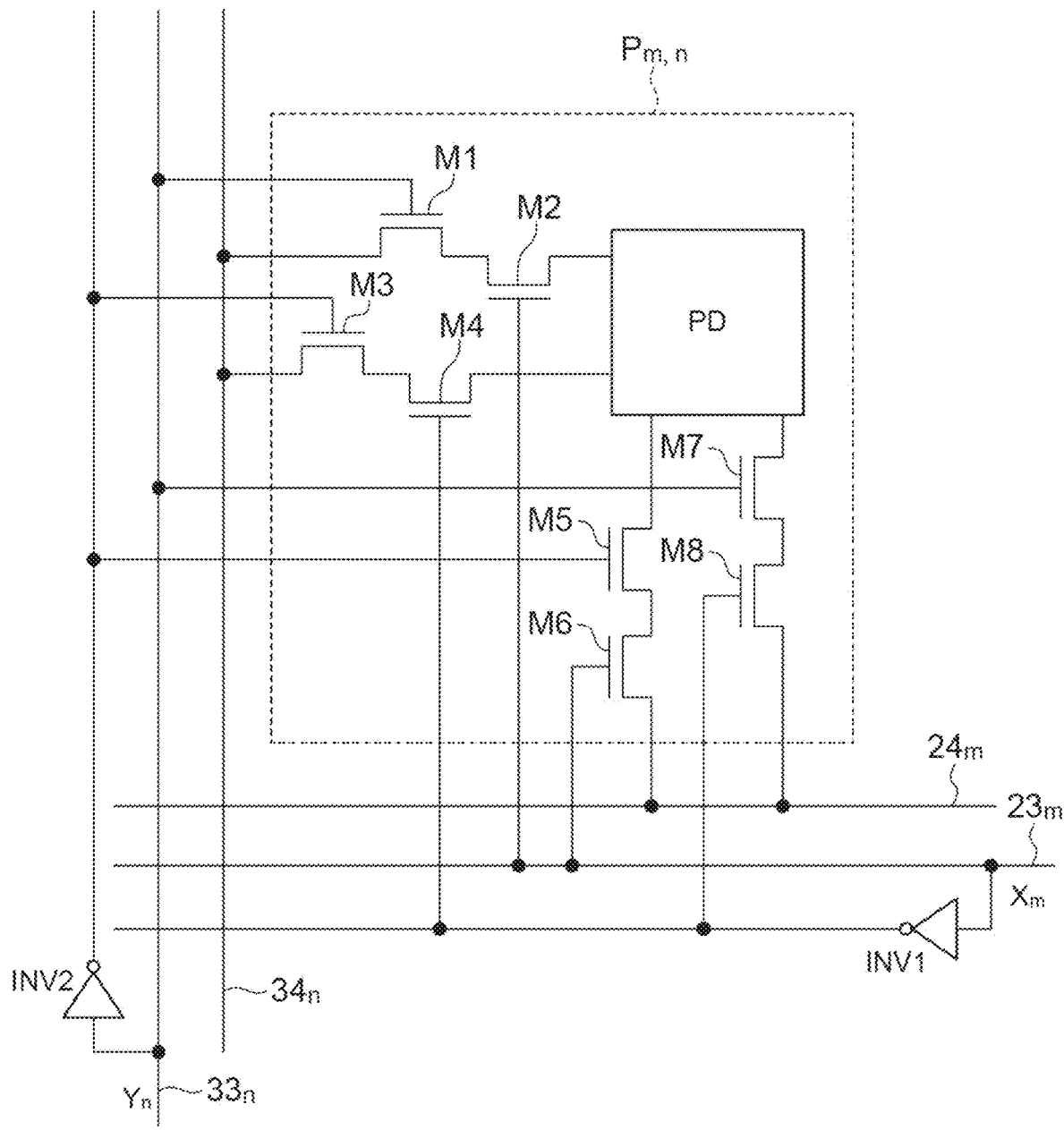
FIG. 35 is a diagram illustrating another circuit configuration example of the pixel $P_{m,n}$.

FIG. 35 is a diagram illustrating another circuit configuration example of the pixel $P_{m,n}$. The pixel $P_{m,n}$ illustrated in this diagram includes a photodiode PD, and NMOS transistors M1 to M8. Each of the NMOS transistors M1 to M8 operates as a switch.

The NMOS transistor M1 is in the ON state when the n-th column control signal $Y_n$ has the logical value 1, and is in the OFF state when the n-th column control signal $Y_n$ has the logical value 0. The NMOS transistor M2 is in the ON state when the m-th row control signal $X_m$ has the logical value 1, and is in the OFF state when the m-th row control signal $X_m$ has the logical value 0. The NMOS transistors M1 and M2 are provided in series between the photodiode PD and the n-th column output line $34_n$, and when these are in the ON state, the charges generated in the photodiode PD are output to the n-th column output line $34_n$.

The NMOS transistor M3 is in the ON state when the n-th column control signal $Y_n$ has the logical value 0, and is in the OFF state when the n-th column control signal $Y_n$ has the logical value 1. The NMOS transistor M4 is in the ON state when the m-th row control signal $X_m$ has the logical value 0, and is in the OFF state when the m-th row control signal $X_m$ has the logical value 1. The NMOS transistors M3 and M4 are provided in series between the photodiode PD and the n-th column output line $34_n$, and when these are in the ON state, the charges generated in the photodiode PD are output to the n-th column output line $34_n$.

When the logical values of the m-th row control signal $X_m$ and the n-th column control signal $Y_n$ are the same, the NMOS transistors M1 to M4 output the charges generated in the photodiode PD to the n-th column output line $34_n$.

The NMOS transistor M5 is in the ON state when the n-th column control signal $Y_n$ has the logical value 0, and is in the OFF state when the n-th column control signal $Y_n$ has the logical value 1. The NMOS transistor M6 is in the ON state when the m-th row control signal $X_m$ has the logical value 1, and is in the OFF state when the m-th row control signal $X_m$ has the logical value 0. The NMOS transistors M5 and M6 are provided in series between the photodiode PD and the m-th row output line $24_m$, and when these are in the ON state, the charges generated in the photodiode PD are output to the m-th row output line $24_m$.

The NMOS transistor M7 is in the ON state when the n-th column control signal $Y_n$ has the logical value 1, and is in the OFF state when the n-th column control signal $Y_n$ has the logical value 0. The NMOS transistor M8 is in the ON state when the m-th row control signal $X_m$ has the logical value 0, and is in the OFF state when the m-th row control signal $X_m$ has the logical value 1. The NMOS transistors M7 and M8 are provided in series between the photodiode PD and the m-th row output line $24_m$, and when these are in the ON state, the charges generated in the photodiode PD are output to the m-th row output line $24_m$.

When the logical values of the m-th row control signal $X_m$ and the n-th column control signal $Y_n$ are different, the NMOS transistors M5 to M8 output the charges generated in the photodiode PD to the m-th row output line $24_m$.

In this circuit configuration example, any one of the unit of the NMOS transistors M1 to M4 and the unit of the NMOS transistors M5 to M8 is in the ON state.

Figure 36:
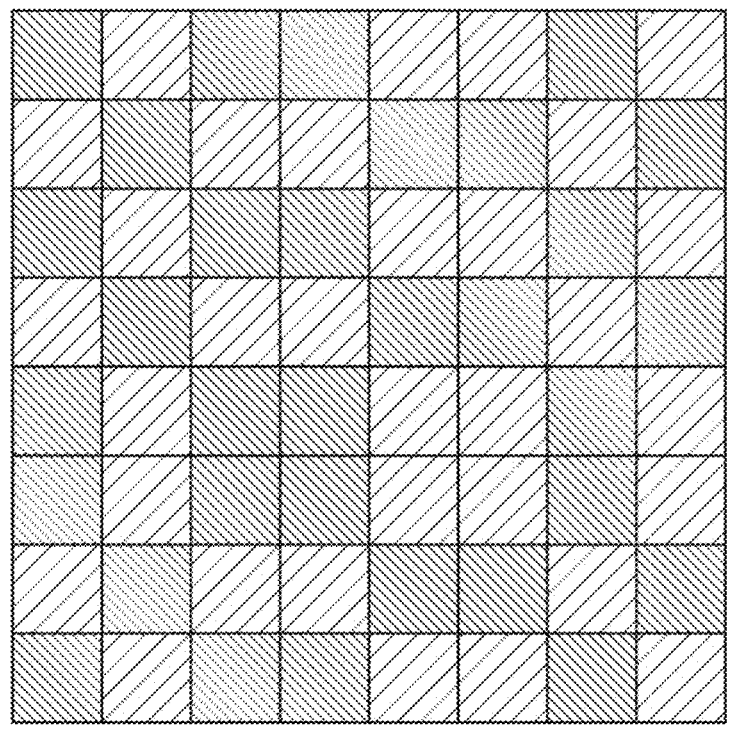
FIG. 36 is a diagram illustrating an example of charge output of each pixel in the pixel array unit 10 when the pixel $P_{m,n}$ is set as the circuit configuration example of FIG. 34 or FIG. 35.

FIG. 36 is a diagram illustrating an example of the charge output of the pixels in the pixel array unit 10 when the pixel $P_{m,n}$ is set as the circuit configuration example of FIG. 34 or FIG. 35. In this diagram also, each of rectangular regions of 8 rows and 8 columns illustrates a pixel. Each of the pixels with first type hatching outputs the charges generated in the photodiode PD to the column output line $34_n$, and each of the pixels with second type hatching outputs the charges generated in the photodiode PD to the row output line $24_m$. In this way, the charges can be output from all the pixels.

As described above, according to the present embodiment, the pixel $P_{m,n}$ selects whether the charges generated in the photodiode are output to the m-th row output line $24_m$ or the n-th column output line $34_n$ based on the logical values of the m-th row control signal $X_m$ and the n-th column control signal $Y_n$ being input to the pixel. In the MN pixels $P_{1,1}$ to $P_{M,N}$ in the pixel array unit 10, the pixels which output the charges to the m-th row output line $24_m$ and the pixels which output the charges to the n-th column output line $34_n$ are determined by the first to M-th row control signals $X_1$ to $X_M$ and the first to N-th column control signals $Y_1$ to $Y_N$.

By changing the pattern of the first to M-th row control signals $X_1$ to $X_M$ or the pattern of the first to N-th column control signals $Y_1$ to $Y_N$, the pixels which output the charges to the m-th row output line $24_m$ can be changed, and further, the pixels which output the charges to the n-th column output line $34_n$ can be changed. Therefore, the solid-state imaging device 1 does not need to use a spatial light modulator which is necessary in the conventional configuration, when acquiring an image by the compressive sensing technique, and thus, an increase in cost and power consumption is suppressed, and arrangement of an optical system is facilitated. That is, the solid-state imaging device 1 can easily perform acquisition of an image by the compressive sensing technique.

Further, an image cannot be reconstructed only from data output from the row readout unit 22 and the column readout unit 32 of the solid-state imaging device 1. For reconstructing the image, the patterns of the first to M-th row control signals $X_1$ to $X_M$ and the first to N-th column control signals $Y_1$ to $Y_N$ are needed, in addition to the data output from the row readout unit 22 and the column readout unit 32.

It can be said that the patterns of the first to M-th row control signals $X_1$ to $X_M$ and the first to N-th column control signals $Y_1$ to $Y_N$ are similar to a key in the encrypted communication. That is, in the compressive sensing technique using the solid-state imaging device 1, the data being encrypted and compressed by the solid-state imaging device 1 can be transmitted to a server coupled through a network without encrypting the image, and thus, it is possible to easily improve security of the data.

The solid-state imaging device is not limited to the embodiments and configuration examples described above, and various modifications are possible. For example, for each of the pixel $P_{m,n}$ the row control unit 21, the row readout unit 22, the column control unit 31, and the column readout unit 32, various circuit configuration examples can be used.

The solid-state imaging device of the above embodiment includes (1) MN pixels each including a photodiode for generating charges by receiving light and arrayed two-dimensionally in M rows and N columns (M and N are each an integer of 2 or more); (2) a row control unit coupled to N pixels of an m-th row (m is an integer of 1 or more and M or less) in the M rows and the N columns by an m-th row control line, and for applying an m-th row control signal to the N pixels of the m-th row via the m-th row control line; (3) a row readout unit coupled to the N pixels of the m-th row in the M rows and the N columns by an m-th row output line, and for inputting the charges generated in the photodiode of each of the N pixels of the m-th row and output to the m-th row output line; (4) a column control unit coupled to M pixels of an n-th column (n is an integer of 1 or more and N or less) in the M rows and the N columns by an n-th column control line, and for applying an n-th column control signal to the M pixels of the n-th column via the n-th column control line; and (5) a column readout unit coupled to the M pixels of the n-th column in the M rows and the N columns by an n-th column output line, and for inputting the charges generated in the photodiode of each of the M pixels of the n-th column and output to the n-th column output line, and (6) the pixel of the m-th row and the n-th column in the MN pixels is configured to select whether the charges generated in the photodiode are output to the m-th row output line or the n-th column output line based on a logical value of each of the m-th row control signal and the n-th column control signal.

In the above solid-state imaging device, a plurality of m-th row control lines may be provided as the m-th row control line. Further, a plurality of n-th column control lines may be provided as the n-th column control line.

In the above solid-state imaging device, a plurality of m-th row output lines may be provided as the m-th row output line. Further, a plurality of n-th column output lines may be provided as the n-th column output line.

In the above solid-state imaging device, the row readout unit may include one or a plurality of capacitors for accumulating charges input via the m-th row output line. Further, the row readout unit may output a voltage value according to a total amount of charges input via all of the m-th row output lines. Further, the row readout unit may sequentially output a voltage value according to an amount of charges input via the m-th row output line.

In the above solid-state imaging device, the column readout unit may include one or a plurality of capacitors for accumulating charges input via the n-th column output line. Further, the column readout unit may output a voltage value according to a total amount of charges input via all of the n-th column output lines. Further, the column readout unit may sequentially output a voltage value according to an amount of charges input via the n-th column output line.

In the above solid-state imaging device, the row control unit may include a shift register for inputting the first to M-th row control signals as serial data and outputting the m-th row control signal to the m-th row control line. Further, the row control unit may include a flip-flop for latching the m-th row control signal output from the shift register and outputting the latched m-th row control signal to the m-th row control line.

In the above solid-state imaging device, the column control unit may include a shift register for inputting the first to N-th column control signals as serial data and outputting the n-th column control signal to the n-th column control line. Further, the column control unit may include a flip-flop for latching the n-th column control signal output from the shift register and outputting the latched n-th column control signal to the n-th column control line.

In the above solid-state imaging device, the pixel of the m-th row and the n-th column may separately include, as the photodiode, a photodiode coupled to the m-th row output line and a photodiode coupled to the n-th column output line.

In the above solid-state imaging device, the pixel of the m-th row and the n-th column may include one photodiode as the photodiode, and, when outputting the charges generated in the photodiode, may output the charges to only one of the m-th row output line and the n-th column output line.

INDUSTRIAL APPLICABILITY

The embodiments can be used as a solid-state imaging device capable of easily performing acquisition of an image by the compressive sensing technique.

REFERENCE SIGNS LIST

1—solid-state imaging device, 10—pixel array unit, 21—row control unit, 22—row readout unit, $23_m$—m-th row control line, $24_m$—m-th row output line, 31—column control unit, 32—column readout unit, $33_n$—n-th column control line, $34_n$—n-th column output line, $41_n$, $42_n$, $44_n$, $45_n$, $47_n$, $48_n$—NMOS transistor, $43_n$, $46_n$—capacitor, 49—conversion unit, 51—shift register, $52_n$—flip-flop, $P_{1,1}$-$P_{M,N}$—pixel.

The invention claimed is:
1. A solid-state imaging device comprising:
MN pixels each including a photodiode configured to generate charges by receiving light and arrayed two-dimensionally in M rows and N columns (M and N are each an integer of 2 or more);
a row control unit coupled to N pixels of an m-th row (m is an integer of 1 or more and M or less) in the M rows and the N columns by an m-th row control line, and configured to apply an m-th row control signal to the N pixels of the m-th row via the m-th row control line;
a row readout unit coupled to the N pixels of the m-th row in the M rows and the N columns by an m-th row output line, and configured to input the charges generated in the photodiode of each of the N pixels of the m-th row and output to the m-th row output line;
a column control unit coupled to M pixels of an n-th column (n is an integer of 1 or more and N or less) in the M rows and the N columns by an n-th column control line, and configured to apply an n-th column control signal to the M pixels of the n-th column via the n-th column control line; and a column readout unit coupled to the M pixels of the n-th column in the M rows and the N columns by an n-th column output line, and configured to input the charges generated in the photodiode of each of the M pixels of the n-th column and output to the n-th column output line, wherein
the pixel of the m-th row and the n-th column in the MN pixels is configured to select whether the charges generated in the photodiode are output to the m-th row output line based on logical values of both the m-th row control signal and the n-th column control signal, and select whether the charges generated in the photodiode are output to the n-th column output line based on logical values of both the m-th row control signal and the n-th column control signal.

2. The solid-state imaging device according to claim 1, wherein a plurality of m-th row control lines are provided as the m-th row control line.

3. The solid-state imaging device according to claim 1, wherein a plurality of n-th column control lines are provided as the n-th column control line.

4. The solid-state imaging device according to claim 1, wherein a plurality of m-th row output lines are provided as the m-th row output line.

5. The solid-state imaging device according to claim 1, wherein a plurality of n-th column output lines are provided as the n-th column output line.

6. The solid-state imaging device according to claim 1, wherein the row readout unit includes one or a plurality of capacitors configured to accumulate charges input via the m-th row output line.

7. The solid-state imaging device according to claim 1, wherein the row readout unit is configured to output a voltage value according to a total amount of charges input via all of the m-th row output lines.

8. The solid-state imaging device according to claim 1, wherein the row readout unit is configured to sequentially output a voltage value according to an amount of charges input via the m-th row output line.

9. The solid-state imaging device according to claim 1, wherein the column readout unit includes one or a plurality of capacitors configured to accumulate charges input via the n-th column output line.

10. The solid-state imaging device according to claim 1, wherein the column readout unit is configured to output a voltage value according to a total amount of charges input via all of the n-th column output lines.

11. The solid-state imaging device according to claim 1, wherein the column readout unit is configured to sequentially output a voltage value according to an amount of charges input via the n-th column output line.

12. The solid-state imaging device according to claim 1, wherein the row control unit includes a shift register configured to input the first to M-th row control signals as serial data and output the m-th row control signal to the m-th row control line.

13. The solid-state imaging device according to claim 12, wherein the row control unit includes a flip-flop configured to latch the m-th row control signal output from the shift register and output the latched m-th row control signal to the m-th row control line.

14. The solid-state imaging device according to claim 1, wherein the column control unit includes a shift register configured to input the first to N-th column control signals as serial data and output the n-th column control signal to the n-th column control line.

15. The solid-state imaging device according to claim 14, wherein the column control unit includes a flip-flop configured to latch the n-th column control signal output from the shift register and output the latched n-th column control signal to the n-th column control line.

16. The solid-state imaging device according to claim 1, wherein the pixel of the m-th row and the n-th column separately includes, as the photodiode, a photodiode coupled to the m-th row output line and a photodiode coupled to the n-th column output line.

17. The solid-state imaging device according to claim 1, wherein the pixel of the m-th row and the n-th column includes one photodiode as the photodiode, and, when outputting the charges generated in the photodiode, outputs the charges to only one of the m-th row output line and the n-th column output line.

* * * * *